US009176668B2

(12) United States Patent
Eleftheriou et al.

(10) Patent No.: US 9,176,668 B2
(45) Date of Patent: Nov. 3, 2015

(54) USER INTERFACE FOR TEXT INPUT AND VIRTUAL KEYBOARD MANIPULATION

(71) Applicant: FLEKSY, INC., San Francisco, CA (US)

(72) Inventors: Kosta Eleftheriou, San Francisco, CA (US); Vasileios Rappos, San Francisco, CA (US)

(73) Assignee: FLEKSY, INC., San Francisco, CA (US)

( * ) Notice: Subject to any disclaimer, the term of this patent is extended or adjusted under 35 U.S.C. 154(b) by 0 days.

(21) Appl. No.: 14/523,789

(22) Filed: Oct. 24, 2014

(65) Prior Publication Data

US 2015/0121285 A1    Apr. 30, 2015

Related U.S. Application Data

(60) Provisional application No. 61/905,820, filed on Nov. 18, 2013, provisional application No. 61/895,352, filed on Oct. 24, 2013.

(51) Int. Cl.
| | |
|---|---|
| *G06F 3/023* | (2006.01) |
| *G06F 3/0484* | (2013.01) |
| *G06F 3/0486* | (2013.01) |
| *G06F 17/27* | (2006.01) |
| *G06F 3/0488* | (2013.01) |

(52) U.S. Cl.
CPC ........ *G06F 3/04886* (2013.01); *G06F 3/04842* (2013.01); *G06F 3/0237* (2013.01); *G06F 3/0486* (2013.01); *G06F 17/273* (2013.01); *G06F 17/276* (2013.01)

(58) Field of Classification Search
CPC . G06F 3/0237; G06F 3/04842; G06F 3/0486; G06F 17/273; G06F 17/276
See application file for complete search history.

(56) References Cited

U.S. PATENT DOCUMENTS

| | | | | |
|---|---|---|---|---|
| 5,745,719 | A * | 4/1998 | Falcon ......................... | 715/856 |
| 6,883,145 | B2 * | 4/2005 | Jaeger ........................ | 715/767 |
| 8,209,183 | B1 * | 6/2012 | Patel et al. ................... | 704/270 |
| 8,904,309 | B1 * | 12/2014 | Zhai et al. .................... | 715/816 |
| 2004/0120583 | A1 * | 6/2004 | Zhai ............................ | 382/229 |
| 2005/0024239 | A1 * | 2/2005 | Kupka .......................... | 341/20 |
| 2005/0169527 | A1 * | 8/2005 | Longe et al. ................. | 382/177 |
| 2006/0001656 | A1 * | 1/2006 | LaViola et al. .............. | 345/179 |

(Continued)

FOREIGN PATENT DOCUMENTS

WO    WO 2013/021385 A2    2/2013

OTHER PUBLICATIONS

"Smartwatch" retrieved on Jan. 8, 2015 from the Internet Archive (www.archive.org) of a http://en.wikipedia.org/wiki/Smartwatch dated Oct. 23, 2013 (6 pages).*

(Continued)

*Primary Examiner* — Eric J Bycer
(74) *Attorney, Agent, or Firm* — Morgan, Lewis & Bockius LLP

(57) ABSTRACT

A user interface allows a user to input text, numbers and symbols in to an electronic device through a touch sensitive input and perform control functions with one or more swipes gestures, swipe and hold gestures and multiple finger tap gestures. The system can differentiate the swipes and perform functions corresponding to the detected swipes based upon swipe direction, number of fingers used in the swipe and the context of the text input.

23 Claims, 39 Drawing Sheets

(56) References Cited

U.S. PATENT DOCUMENTS

| | | |
|---|---|---|
| 2006/0055669 A1* | 3/2006 | Das ................................ 345/156 |
| 2008/0168366 A1* | 7/2008 | Kocienda et al. ............. 715/764 |
| 2009/0077464 A1* | 3/2009 | Goldsmith et al. ........... 715/257 |
| 2010/0058251 A1* | 3/2010 | Rottler et al. ................. 715/863 |
| 2010/0281374 A1* | 11/2010 | Schulz et al. ................. 715/723 |
| 2010/0295793 A1* | 11/2010 | Srinivasan et al. ............ 345/173 |
| 2011/0141027 A1* | 6/2011 | Ghassabian ................... 345/168 |
| 2011/0302489 A1* | 12/2011 | Zimmerman ................. 715/256 |
| 2012/0011462 A1* | 1/2012 | Westerman et al. ........... 715/773 |
| 2012/0029910 A1* | 2/2012 | Medlock et al. ................... 704/9 |
| 2012/0092278 A1* | 4/2012 | Yamano ........................ 345/173 |
| 2013/0014041 A1* | 1/2013 | Jaeger ........................... 715/765 |
| 2013/0046544 A1* | 2/2013 | Kay et al. ....................... 704/275 |
| 2013/0138424 A1 | 5/2013 | Koenig et al. |
| 2013/0174082 A1 | 7/2013 | Khandker et al. |
| 2013/0212515 A1 | 8/2013 | Eleftheriou |
| 2013/0227460 A1 | 8/2013 | Jawerth et al. |
| 2013/0246329 A1* | 9/2013 | Pasquero et al. ................ 706/52 |
| 2014/0063067 A1* | 3/2014 | Compton et al. .............. 345/660 |

OTHER PUBLICATIONS

International Search Report and Written Opinion, PCT/US2014/062293, Jan. 23, 2015, 15 pgs.

* cited by examiner

USER INTERFACE FOR TEXT INPUT AND VIRTUAL KEYBOARD MANIPULATION

CROSS REFERENCE TO RELATED APPLICATIONS

This application claims priority to U.S. Provisional Patent Application No. 61/905,820, "User Interface For Text Input and Virtual Keyboard Manipulation" filed Nov. 18, 2013, and U.S. Provisional Patent Application No. 61/895,352, "User Interface for Text Input and Virtual Keyboard Manipulation" filed Oct. 24, 2013, both of which are hereby incorporated by reference in their entirety.

FIELD OF INVENTION

This invention relates to user interfaces and in particular to text, number and symbol input and correction on touch screen input devices such as smart phones and smart watches.

BACKGROUND OF THE INVENTION

The present invention relates to devices capable of recording finger movements. Such devices include, for example, computers and phones featuring touch screens, or other recording devices able to record the movement of fingers on a plane or in three-dimensional spaces.

A number of devices where finger interaction is central to their use have recently been introduced. They include mobile telephones (such as IPHONE, a registered trademark of Apple Inc., GALAXY S, a registered trademark of Samsung Electronics Co., Ltd's), tablet computers (such as IPAD, a registered trademark of Apple Inc., or the Blackberry Playbook PLAYBOOK, a trademark of Blackberry Limited), as well as a range of mobile computers, tablets, smart watches, PDAs and satellite navigation assistants. The growth in the use of smart phones, tablets and smart watches in particular has accelerated the introduction of touch screen input for many users and uses.

In some devices featuring a touch screen, it is common for systems to emulate a keyboard text entry system. The devices typically display a virtual keyboard on screen, with users tapping on the different letters to input text. The lack of tactile feedback in this typing process means that users are typically more error prone than when typing on hardware keyboards.

Most text correction systems feature a combination of auto-correcting and manual-correcting (or disambiguation) functionality. Typically, the system will attempt to guess and automatically correct common typing errors. However, many systems perform the auto-correction without any indication of the corrections. Thus, the user must constantly watch what the system is inputting and make manual corrections if an auto-correction error is detected which can slow the text input process. Other correction systems give the user the ability to reject an automatic correction, or manually select an alternative one.

A common problem with such systems is that the user is required to be precise in their typing, and also to be precise in their operation of the auto- and manual-correcting functionality. Such operation typically requires the user to interact with the touch screen by pressing on specific areas of the screen to invoke, accept, reject, or change corrections.

The present invention describes a suite of functions allowing users a much more intuitive, faster and accurate interaction with such a typing system. The resulting system is dramatically more accessible and easy to use for people with impaired vision, compared to other existing systems.

SUMMARY OF THE INVENTION

The present invention is directed towards a system that interprets gestures input thorough a touch screen of an electronic computer device such as touch screen computers, tablets, smart watches, etc. The electronic devices can operate software that allows text to be input. The text can be input through a virtual keyboard on the touch screen or through any other text input systems such as voice to text mechanisms.

The system can input text by tapping on the virtual keyboard on the touch screen. The system can also detect the type of gesture, the direction of the gesture and the context of the text that has been input. Based upon the type, direction and context of the gesture, a predetermined function can be performed by the system. The functions can be grouped according into several types of gestures. For example, single finger swipe gestures can perform various tasks based upon the direction and context of the text input. A single finger right swipe in the context of a partial word can cause the system to replace the partial word with a first suggested word and insert a space after the first suggested word. If the first suggested word is not the intended word, the user can input a one finger up/down swipe gesture(s) to replace the first suggested word with a second suggested word. The user can repeat the down swipe gestures to scroll through the suggested words until the suggested word matches the desired word. The user can perform up swipes to return to the previous suggested words and the system will display the original input text after the first suggested word. Once the desired word is input the user can resume tapping on letters to input a next word.

Once the user has input the last word of a sentence, the user can input a one finger or a two finger right swipe. The system can interpret the context of a one finger or two finger right swipe immediately after a word has been input as a user request for a punctuation mark. The normal punctuation mark input can be a period. However, if this is not the desired punctuation mark, the user can input single finger up or down swipes as described above to input other suggested punctuation marks. In other embodiments, the inventive system can analyse the context of the input text and initially suggest a punctuation mark such as a question mark or exclamation mark in response to two sequential right swipes. In some embodiments, the system can analyse the types of words that have been input in the sentence. If the first word of the sentence is an interrogatory type word such as Which, How, What, Why Where, When, Will, Are, Can, Is, etc. can indicate that the sentence is a question. In an embodiment, the inventive system can detect the presence of interrogative words and may input a question mark "?" rather than a period "." in response to a punctuation mark gesture.

In an embodiment, the system can predict the next word that the user would like to input and may display a set of suggested next words. This next word prediction can be based upon an n-gram methodology wherein a large volume of writings can be analysed to determine probabilities of different multiple word combinations. The predicted words can be displayed in a suggested word area and can be arranged based upon the statistical probability of the word combinations. In an embodiment, the user can use a single finger right swipe to input the first predicted word. In an embodiment, if the first predicted word is not the desired word, the user can either use up/down swipes to scroll through the predicted word list or input individual text letters to manually input the next word.

In some embodiments, the suggested words can include both words and punctuation marks.

The system can also interpret right swipe and hold gestures as requests to repeat the last input. For example, if the last input was a period punctuation mark a subsequent right swipe and hold will result in additional periods being input. The input can be repeated until the swipe and hold gesture is released.

The system can interpret left swipes is delete functions depending upon the context of the text input. For example, a left swipe while in the middle of a word can delete a single letter. However, if the left swipe is after an entire word is input, the system can delete the entire word. A left swipe and hold can repeat the prior deletion functions until the single finger left swipe and hold gesture is released.

In addition to text controls, the inventive system can detect gestures for performing other non-text input of functions. For example, the user can input additional words to the system dictionary using gestures. When a sequence of characters is input, the system will include the exact text input and the suggested words in the sequence: exact text input, first suggested word, second suggested word, third suggested word, etc. So if the system responds to a right swipe by changing the exact input text with the first suggested word, the user can up swipe and the original exact input text can be displayed and input. A subsequent single finger up swipe can cause the exact text to be input to the dictionary. If the user does not want to add the word to the dictionary an immediate single finger down swipe can cause the exact text to be removed from the dictionary.

The system can also interpret gestures to change keyboards and keyboard layouts. The system can include various keyboards including a basic QWERTY keyboard as well as other number, symbol and foreign language keyboards. In an embodiment, the system can include a keyboard key(s) which can be tapped to change the keyboards being used by the device. In many devices, the touch screen can be very small and it must provide an area for text input and an area for input text display. The inventive system can allow a user to make the keyboard text input section invisible to make more of the screen available for displaying input text. In an embodiment, the inventive system can interpret two finger up or down swipes as controls for changing the displayed keyboards, which can be switched between a full keyboard, a minimal keyboard and an invisible keyboard. Because many users can memorized the layout of a QWERTY keyboard, it may not be necessary to display this basic keyboard.

Some devices such as smart phones are held in one hand and text is input with the user's thumb which can be on the left or right side of the touch screen depending upon which hand is holding the phone. In an embodiment, the inventive system can respond to a two or a three finger left swipe gesture by shifting the keyboard to the left of the touch screen which can be more comfortable for left handed users. Conversely, the system can interpret a two or three finger right swipe as a command to shift the keyboard to the right side of the touch screen.

DETAILED DESCRIPTION

Figure 1:
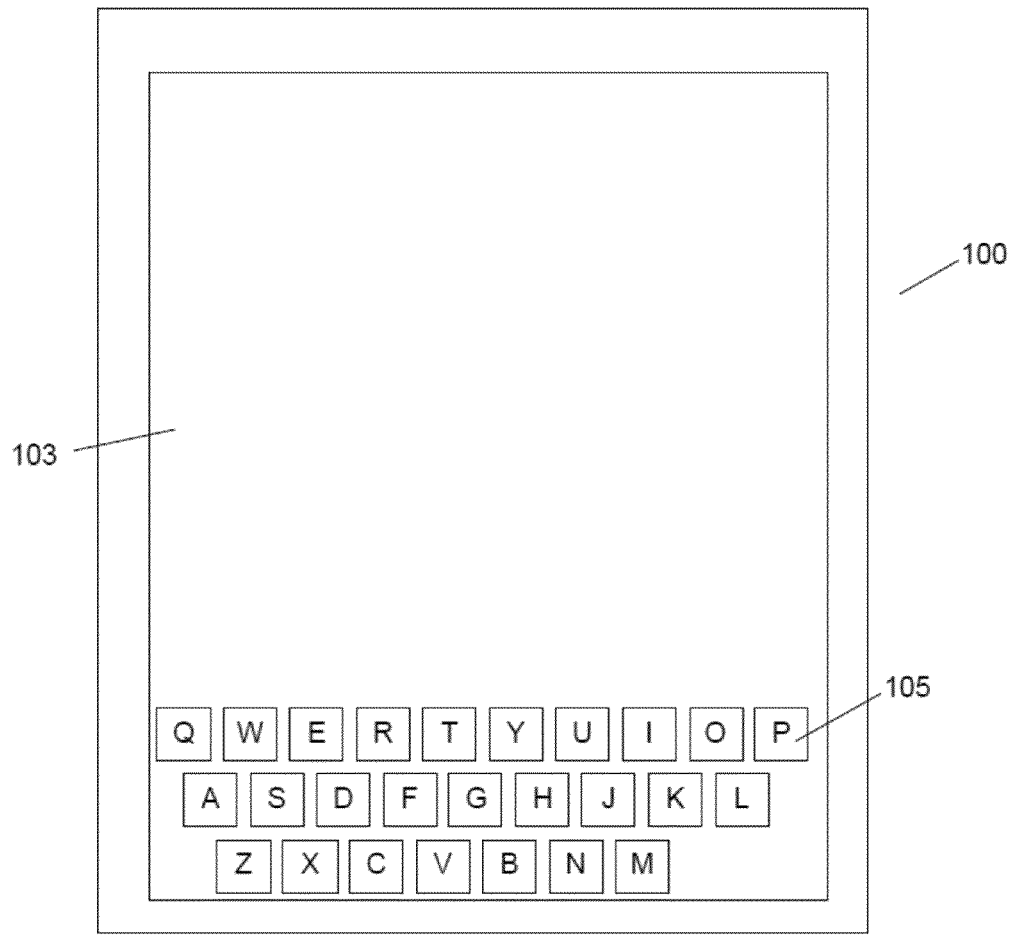
FIG. 1 illustrates an embodiment of a device that includes a virtual keyboard displayed on a touch screen and hardware buttons.

The invention is directed towards gesture controls input to a device comprising a display capable of presenting a virtual keyboard which can be any area where the user input text can be displayed and a touch-sensitive controller such as a touch pad or a touch screen. However, in other embodiments, a screen or a touch-sensitive controller may not be required to perform the method of the claimed invention. For example, in an embodiment, the input device can simply be the user's body or hands and a controller that is able to understand the user's finger movements in order to produce the desired output. In addition to the finger inputs, in other embodiments such as tablet and smart watch applications, other device sensors can be used as input devices. For example, internal device accelerometers and gyroscopes can be used in conjunction with the touch screen input to control the operation and input text to the device. The output can be either on a screen or through audio signals. For example, the input device may be a camera such as a controller of KINECT, a registered trademark of Microsoft Corporation, that is directed at the user. The cameras can detect the movement of the user and the output can be transmitted through speakers or other audio devices such as headphones. Optionally, the output can be transmitted through an output channel capable of audio playback, such as speakers, headphones, or a hands-free ear piece.

In some embodiments, the device may be a mobile telephone, a tablet computer or a smart watch. In such cases, the text display and touch-sensitive controller may both be incorporated in a single touch-screen surface or be separate components. With the inventive system, the user controls the electronic device using the touch-sensitive controller in combination with performing a number of "gestures" which are detected by the touch-sensitive controller. Some existing systems are capable of detecting gestures input to a touch-sensitive controller such as U.S. Patent Publication Nos. US 2012/0011462, US 2013/0021248 and US 2013/0212515, which are each hereby incorporated by reference.

The inventive system may be programmed to recognize certain types of gestures including: single finger and multiple finger tapping, swiping and combinations of taps and swipes. Tapping at different areas of the screen and different quantities of taps. For example, the system can distinguish between a single tap, a double tap, a triple tap, a quadruple tap, etc. The multiple taps can be by the same finger or multiple fingers such as two finger taps, three finger taps, four finger taps, etc.

In yet another embodiment, the system can detect multiple taps with different fingers. For example, a first tap with a first finger, a second tap with a second finger, a third tap with a third finger and a fourth tap with a fourth finger. These multiple taps, can also include any variation or sequence of finger taps. For example, a first tap with a first finger, a second tap with a second finger, a third tap with a first finger and a fourth tap with a third finger. The disclosed tapping can be described as "tap gestures."

Swiping can include touching the screen and sliding the finger across the screen in different directions across the screen and a different locations on the screen. Swiping can also be performed using one or more fingers. The system can differentiate these different swipes based upon the number of fingers detected on the screen. The system may be able to distinguish between linear swipes and rotational swipes. Linear swipes can be detected as a touching of the input at a point a movement while maintaining contact in a specific direction which can be up, down, left, right and possibly diagonal directions as well such as: up/right, up/left, down/right and down/left. Rotational swipes can be detected as a touching of the input at a point and a circular movement while maintaining contact. The system can detect clockwise and counter-clockwise rotational swipes.

The system may also detect combinations of gestures. For example, a linear swiping gesture as described above followed by holding the finger on a screen for a short time before releasing. The holding of the finger on the screen can be described as a "hold gesture" and the combination of the swipe and hold can be described as a "swipe and hold" gesture. This combination gesture can include holding the finger(s) against the screen at the end of the swipe for a predetermined period of time which can be longer than 1 second.

Typically, the user will use tap gestures to type the individual letters used to create words on a virtual keyboard, emulating a typing movement. Unlike most virtual keyboards, there may not be any control keys such as space, backspace and shift. Instead these functions can be performed using other touch gestures. In an embodiment, all tapping, swipes and other detected gestures must take place within the designated keyboard area of the touch input device which can be the lower part of a touch screen where a virtual keyboard and editing information may be displayed.

The inventive system can also correct the user's text input as he types, using an algorithm to identify and analyse typing errors. When the system detects the user may have made such an error, the correction algorithm will provide alternative suggestions on an optical display or via audio feedback.

The user can navigate through the correction algorithm suggestions using a set of defined swipe and swipe-and-hold gestures. Additionally, the user may be able to insert symbol characters, and to format the text, using either swipe and/or swipe and hold gestures. Typically, all gestures will be restricted to some area of the touch surface, most commonly the area of the onscreen keyboard. However, in an embodiment, the inventive text input system can detect gestures on any portion of the touch screen input device. The present invention will thus provide a comprehensive text input system incorporating spelling/typing check, format, and advanced input, by detecting applicable gestures.

With reference to FIG. 1, a top view of an exemplary electronic device 100 is illustrated that implements a touch screen-based virtual keyboard 105. The illustrated electronic device 100 includes an input/display 103 that also incorporates a touch screen. The input/display 103 can be configured to display a graphical user interface (GUI). The GUI may include graphical and textual elements representing the information and actions available to the user. For example, the touch screen input/display 103 may allow a user to move an input pointer or make selections on the GUI by simply pointing at the GUI on the input/display 103.

The GUI can be adapted to display a program application that requires text input. For example, a chat or messaging application can be displayed on the input/display 103 through the GUI. For such an application, the input/display 103 can be used to display information for the user, for example, the messages the user is sending, and the messages he or she is receiving from the person in communication with the user. The input/display 103 can also be used to show the text that the user is currently inputting in text field. The input/display 103 can also include a virtual "send" button, activation of which causes the messages entered in text field to be sent.

The input/display 103 can be used to present to the user a virtual keyboard 105 that can be used to enter the text that appears on the input/display 103 and is ultimately sent to the person the user is communicating with. The virtual keyboard 105 may or may not be displayed on the input/display 103. In an embodiment, the system may use a text input system that does not require a virtual keyboard 105 to be displayed.

If a virtual keyboard 105 is displayed, touching the touch screen input/display 103 at a "virtual key" can cause the corresponding text character to be generated in a text field of the input/display 103. The user can interact with the touch screen using a variety of touch objects, including, for example, a finger, stylus, pen, pencil, etc. Additionally, in some embodiments, multiple touch objects can be used simultaneously.

Because of space limitations, the virtual keys may be substantially smaller than keys on a conventional computer keyboard. To assist the user, the system may emit feedback signals that can indicate to the user what key is being pressed. For example, the system may emit an audio signal for each letter that is input. Additionally, not all characters found on a conventional keyboard may be present or displayed on the virtual keyboard. Such special characters can be input by invoking an alternative virtual keyboard. In an embodiment, the system may have multiple virtual keyboards that a user can switch between based upon touch screen inputs. For example, a virtual key on the touch screen can be used to invoke an alternative keyboard including numbers and punctuation characters not present on the main virtual keyboard. Additional virtual keys for various functions may be provided. For example, a virtual shift key, a virtual space bar, a virtual carriage return or enter key, and a virtual backspace key are provided in embodiments of the disclosed virtual keyboard.

Figure 2:
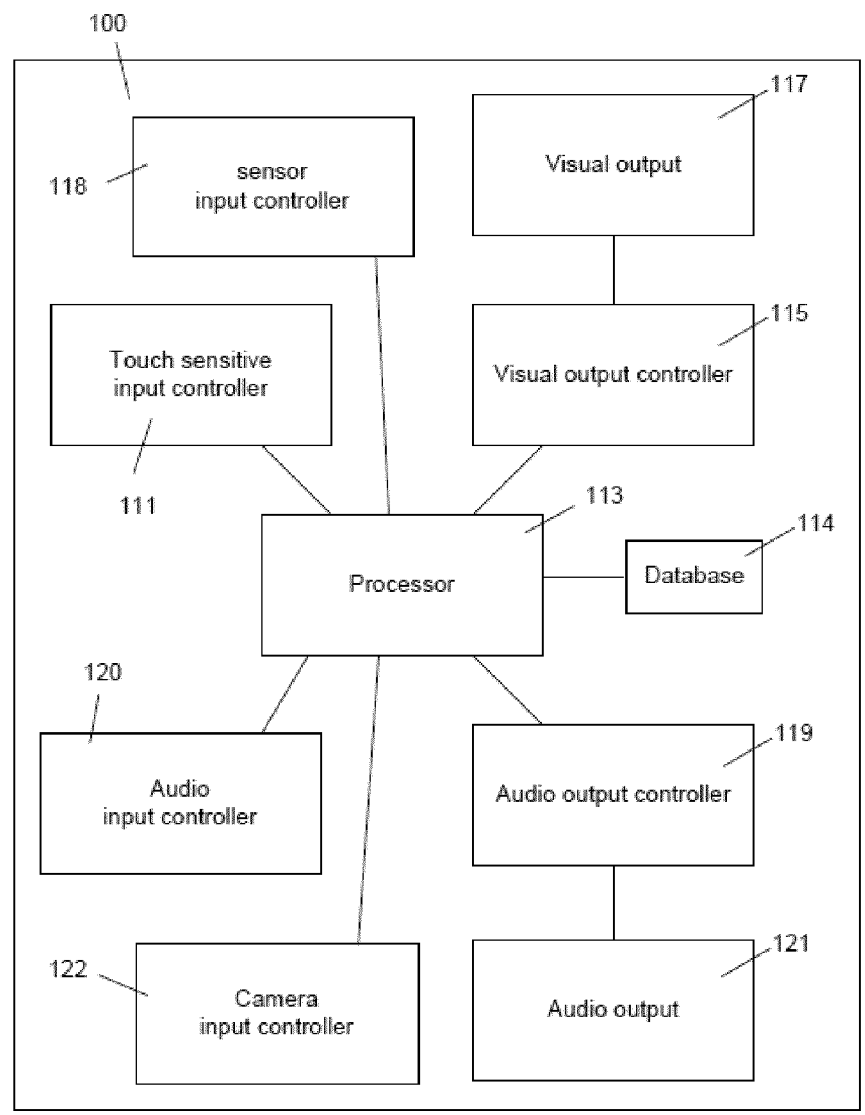
FIG. 2 illustrates a block diagram of system components.

FIG. 2 illustrates a block diagram of an embodiment of the device capable of implementing the current invention. The device 100 may comprise: a touch-sensitive input controller 111, a processor 113, a database 114, a visual output controller 115, a visual display 117, an audio output controller 119, an audio output 121, sensor input controller(s) 118, an audio input controller 120 and a camera input controller 122. The sensor input controller(s) 118 can include 3-axis (X, Y and Z) accelerometers and gyroscopes. In other embodiments the device 100 may include a range of other controllers and other components that may perform a wide number of functions.

Basic Input

In an embodiment of the current invention, the user will use an input device which can be a touch screen to enter text. The system will assume a virtual keyboard, which may or may not be visible to the user. This will have a map of different "virtual keys" and may resemble the layout of a real keyboard, using QWERTY or some other keyboard layout like DVORAK. The user will be able to input text by applying tap gestures on the different virtual keys. The device will detect the locations of the user's taps or the relative locations of multiple taps and produce typed characters on the screen. The user may tap on the input device one or more times with each tap usually representing one key stroke. The virtual keyboard may or may not be visible on a display or screen. In addition to taps to input text, the user can also input gestures that can cause the system to perform specific functions. The touch screen input can be fairly large in devices such as tablet computers. However, in other embodiments such as smart watches, the touch screen can be very small.

In an embodiment, the inventive system can perform multiple functions using the same detected gesture based upon the context of the gesture. For example, a single finger right swipe can be interpreted as one of several functions including: space, autocorrect, next word prediction/suggestion, punctuate, repeat punctuation and move cursor at end of a word.

Figure 3:
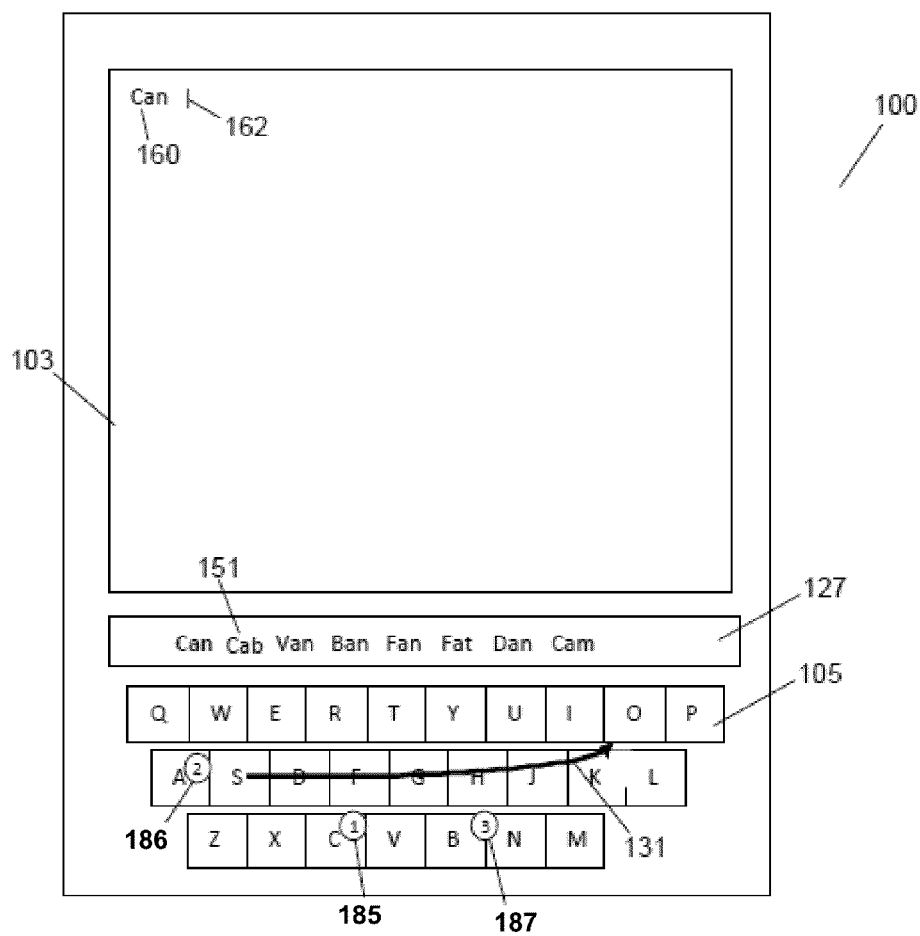
FIGS. 3-12 illustrate embodiments of the device performing text input and word correction gesture functions.

With reference to FIG. 3, if the context of the right swipe is after a known word that is in an appropriate location in a string of the input text, the inventive system may interpret the right swipe as a request to input a space after the completed word. For example, the user can use the inventive system and tap at points (1) 185, (2) 186 and (3) 187 which are respectively near letters C, A and N on the virtual keyboard 105. The system may initially display the exact input text "Can" 160 corresponding the locations and sequence of the tap gestures on the display 103. The system may automatically respond to this input by altering the input text. Because this is the first word of a possible sentence, the first letter "C" may automatically be capitalized. The system may also automatically display possible intended words 151 including: Can, Cab, Van, Ban, Fan, Fat, Dan and Cam on a possible word area 127 of the display 103. In this example, the text "Can" is a complete and known word. Thus, the system can interpret a subsequent right swipe 131 gesture as a command to complete the word input and add a space after the word Can 160. The cursor 162 is shown a space to the right of the word Can 160 and the system is ready to input the next word.

Basic Text Correction

Figure 4:
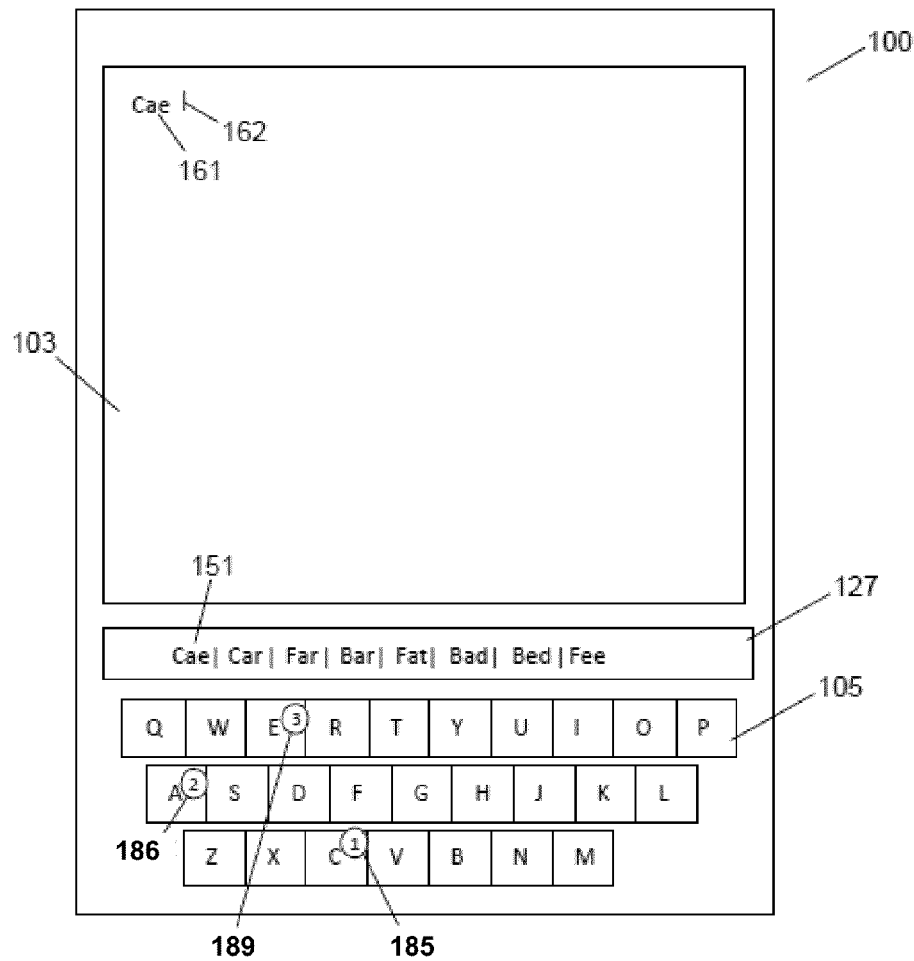

In an embodiment, the system can alternatively interpret the right swipe gesture as a request for auto-correction and a space. With reference to FIG. 4, the user can tap at points (1) 185, (2) 186 and (3) 189 which are respectively near letters C, A and E on the virtual keyboard 105. The system may not provide any suggestions (as shown on FIG. 4), before a right swipe gesture is input. The system may initially display the exact input text "Cae" 161 on the display 103 corresponding the locations and sequence of the tap gestures on the virtual keyboard 105.

Figure 5:
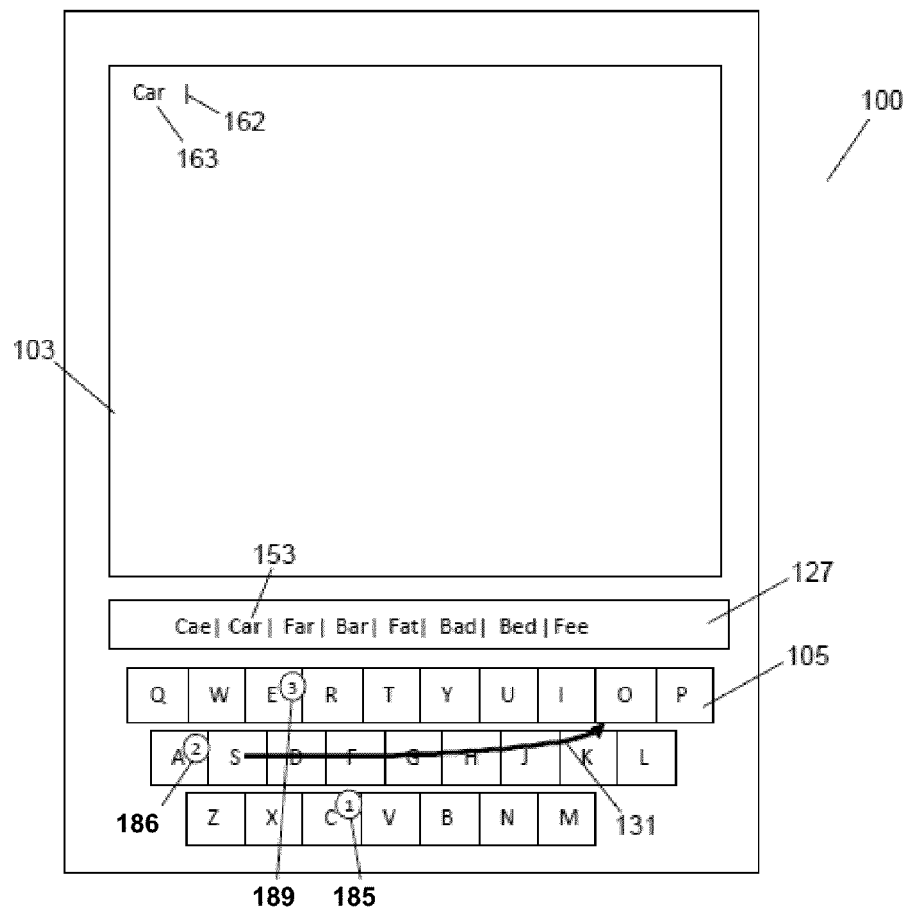

With reference to FIG. 5, the user may have entered the text described with reference to FIG. 4 and then made a right swipe gesture 131. Because the text "Cae" is not a word, the system may respond to this gesture by attempting to correct the input text. In this example, the system changes the text Cae to Car 163. The system may also automatically display possible intended words 153 including: Cae, Car, Far, Bar, Fat, Bad, Bed, and Fee on a possible word area 127 of the display 103. The current suggested word "Cae" may be indicated by bolding the text as shown or by any other indication method such as highlighting, flashing the text, bold, contrasting color, etc. In this example, the text "Cae" is bold or otherwise indicated in the 151 on the display. The system can continue to make additional suggestions as letters are added or deleted by the user through the input touch screen.

Figure 6:
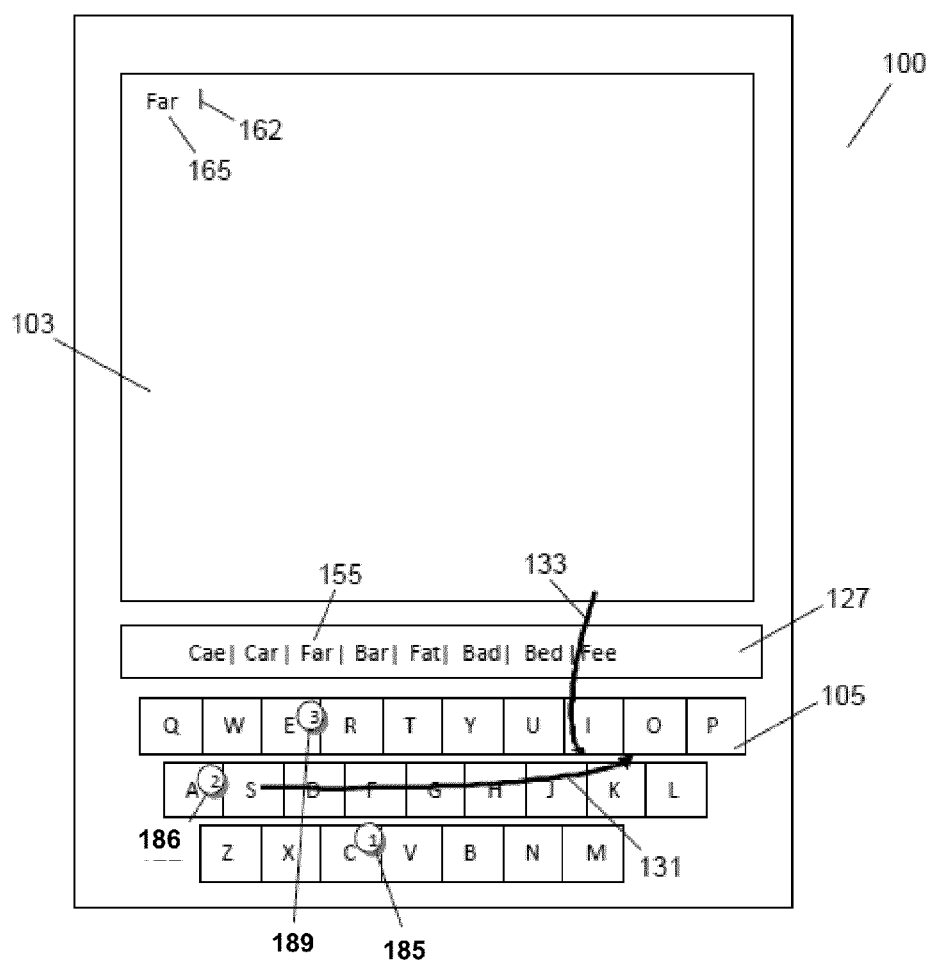

In this example, the input text "Cae" 161 shown in FIG. 4 and the suggested word "Car" 163 shown in FIG. 5 may not be what the user intended to write. The user can input an up or down swipe gesture to manually correct the text input. In an embodiment, up swipes can cause the displayed word to scroll backwards amongst the group of suggested words and down swipes can cause the displayed word to scroll forwards. Thus, an up swipe can cause the text, Cae to be displayed again as shown in FIG. 4 and a down swipe gesture 133 can cause the next suggested word Far 165 to be displayed as shown in FIG. 6. Continued down swipe gestures can cause additional suggested words 155 which can include: Car, Far, Bar, Fat ... to be displayed one at a time for each down swipe gesture. The selected suggested word is displayed in the text field and once the desired word is in the text field, the user can continue to type additional characters which can automatically cause a space is added after the selected word and displayed word Far 165.

Advanced Text Correction

Figure 7:
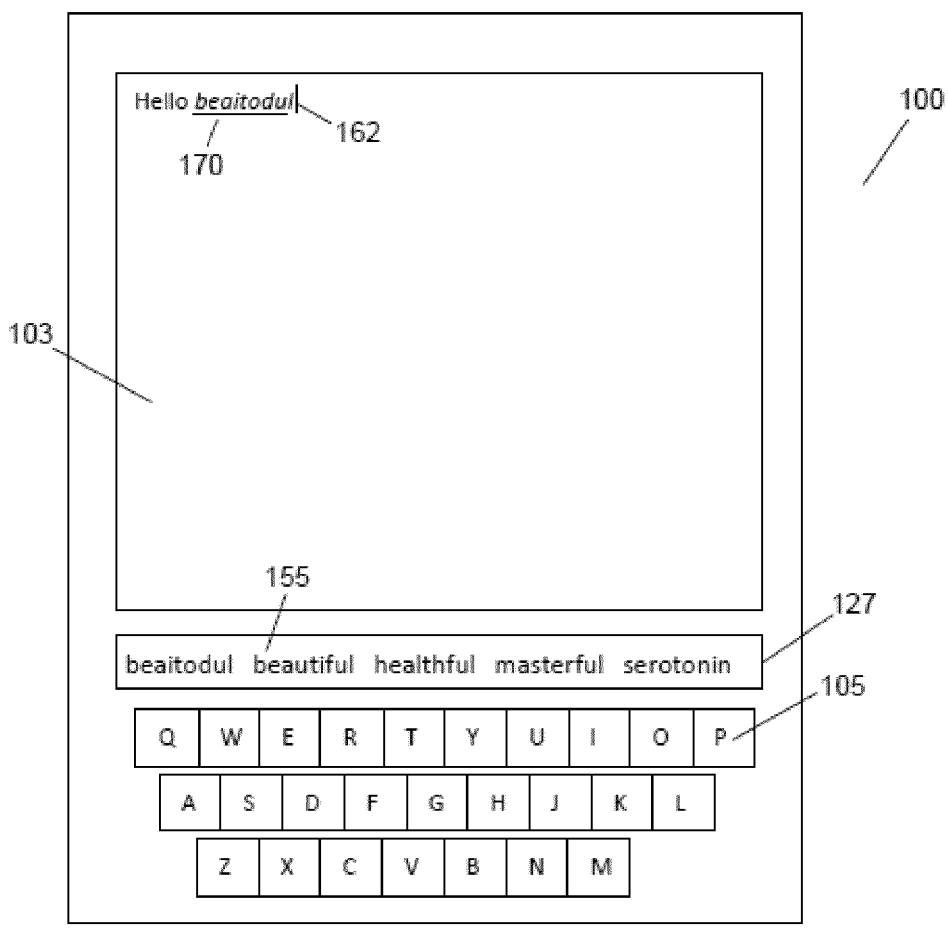
Figure 8:
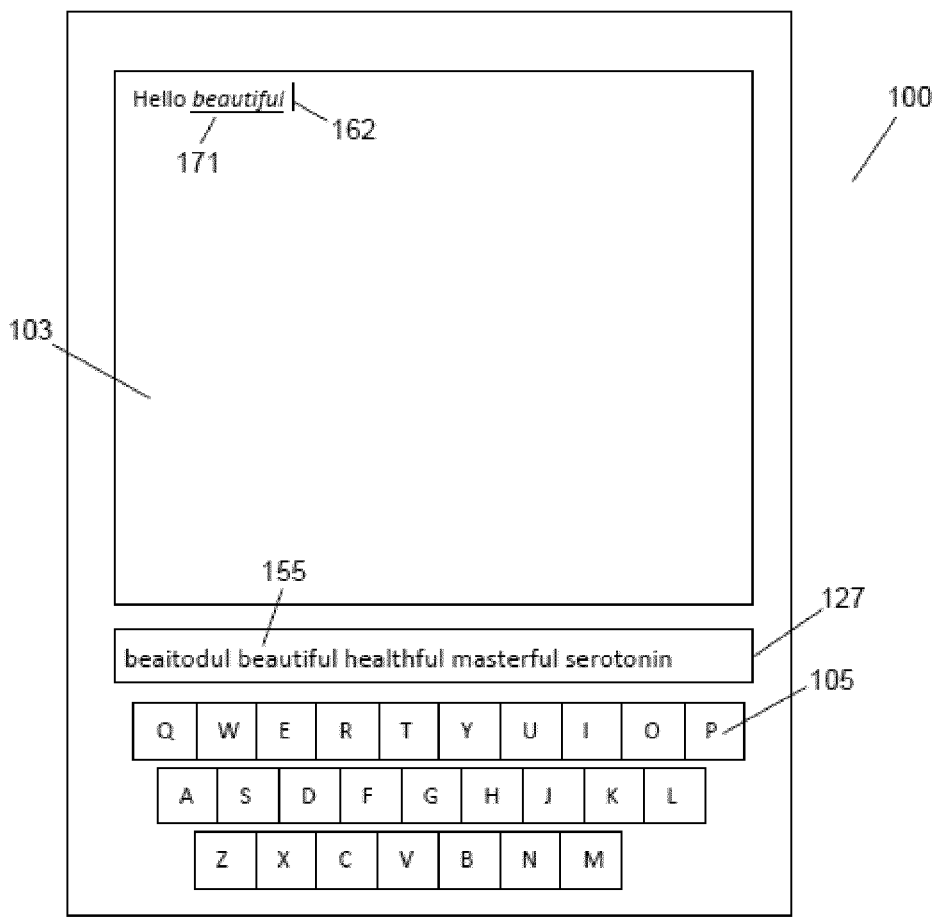

In an embodiment, the inventive system can indicate an active word that may not be the word that is currently being typed. For example, with reference to FIG. 7, the user has typed the partial sentence, "Hello beaitoduIl". The user inputs a single finger right swipe and the inventive system attempts to auto-correct the input. In this example, the system does not recognize the text beaitodul 170, so this text is changed to "beautiful" as shown in FIG. 8. In this case, the text "beautiful" 171 is both the active word and the word that the cursor 162 is with. The inventive system, which handles text manipulation, considers the space that follows entered words, an attribute to that "textblock", so the space between the word and the cursor does not separate the word from the cursor. The suggested words 155 can include: beaitodul, beautiful, healthful, masterful, serotonin.

Figure 9:
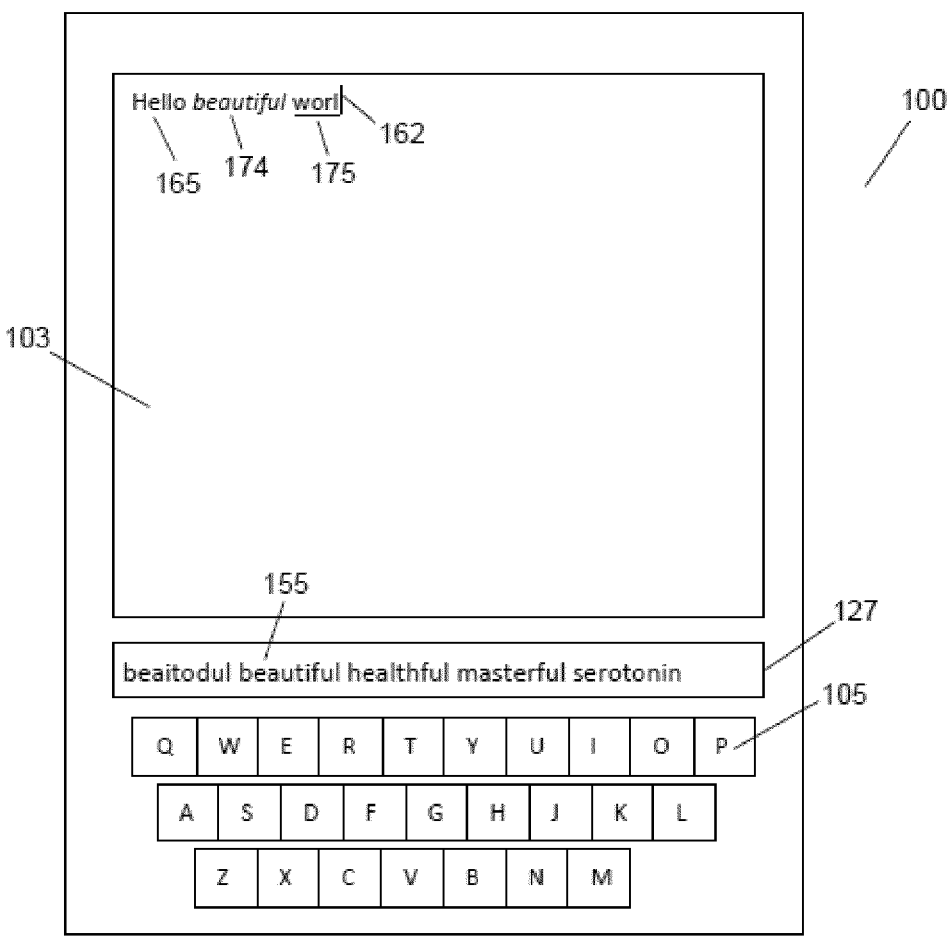

With reference to FIG. 9, the user has subsequently typed, "Hello beautiful worll". The user is almost through typing the word "world" and the cursor 162 is a vertical line adjacent to the text, "worl" 175. The word that the cursor is within is underlined and the "active" word beautiful 174 is in italics for illustrative purposes. In the actual system, the active word may not be in italics. In this embodiment, up/down swipes will change the suggestion for the complete input active word "beautiful" 174, which is the last corrected full word. In the word suggestion area 127, the suggested words 155 still include, "beaitodul, beautiful, healthful, masterful, serotonin . . . ."

Figure 10:
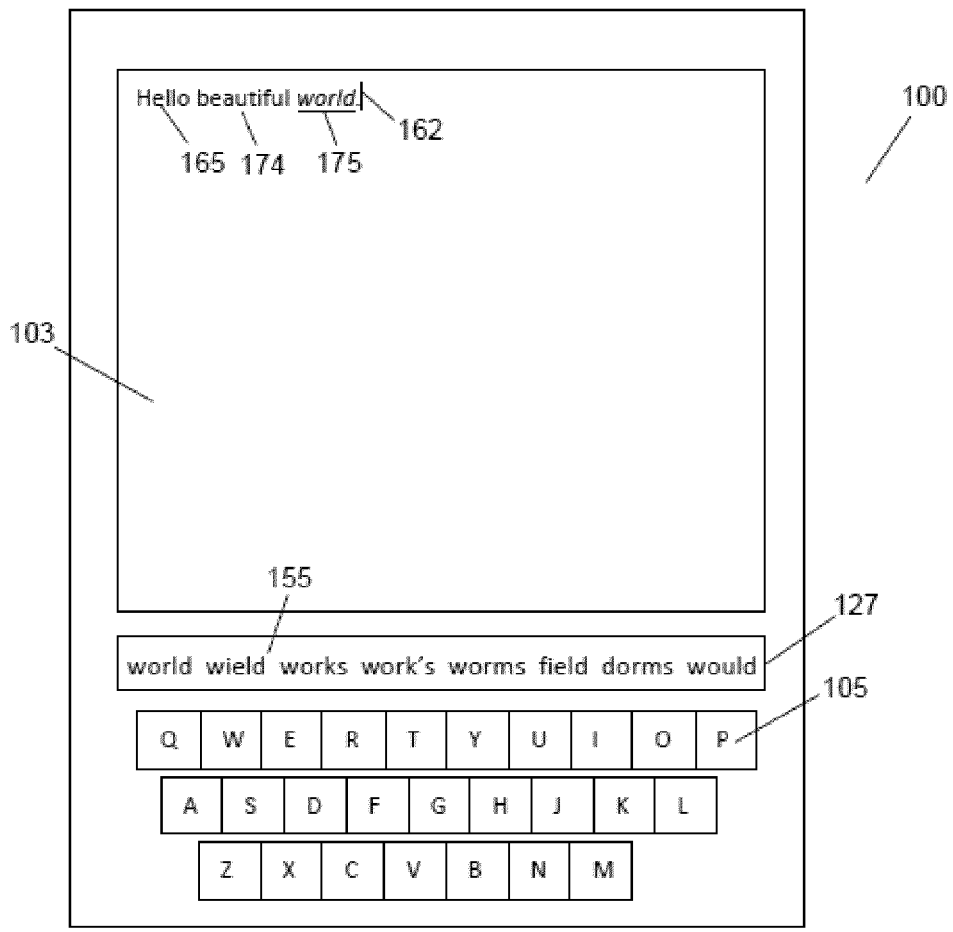

With reference to FIG. 10, after the user has finished typing, the sentence will appear as, "Hello beautiful world". Note that the word "world" 175 is now both the active word and the word that the cursor 162 is with and an up swipe or a down swipe in this context will cause the system to change the word "world" 175. In the word suggestion area 127, the suggested words 155 include, "world wield works work's worms field dorms would . . . ."

Figure 11:
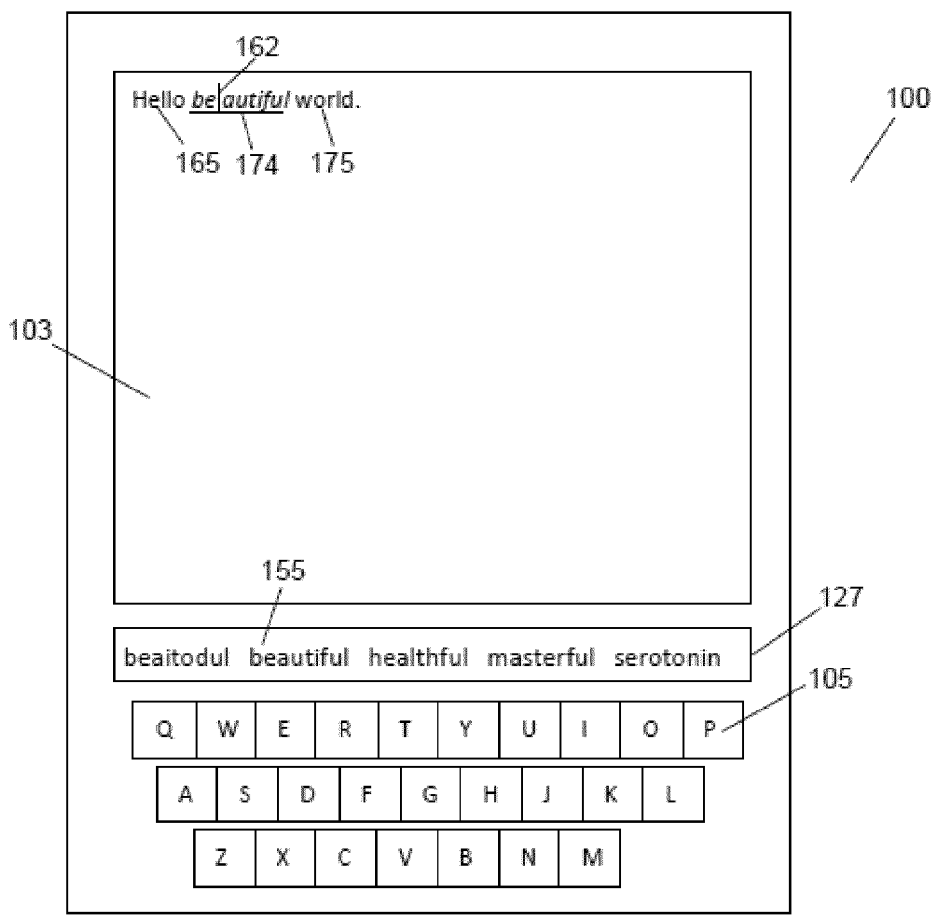

With reference to FIG. 11, once the sentence is complete, the user may want to edit the word "beautiful" 174. The user can manually move the cursor 162 anywhere inside any of the displayed words as illustrated. In an embodiment, the cursor 162 can be moved by touching the display 103 at the desired cursor 162 location. In this example, the user has moved the cursor 162 between the letters e and a in the word beautiful 174 and the displayed text is, "Hello belautiful world." Since the cursor 162 has been manually moved to the previous word, the active word and the word associated with the cursor 162 is now "beautiful" 174.

Figure 12:
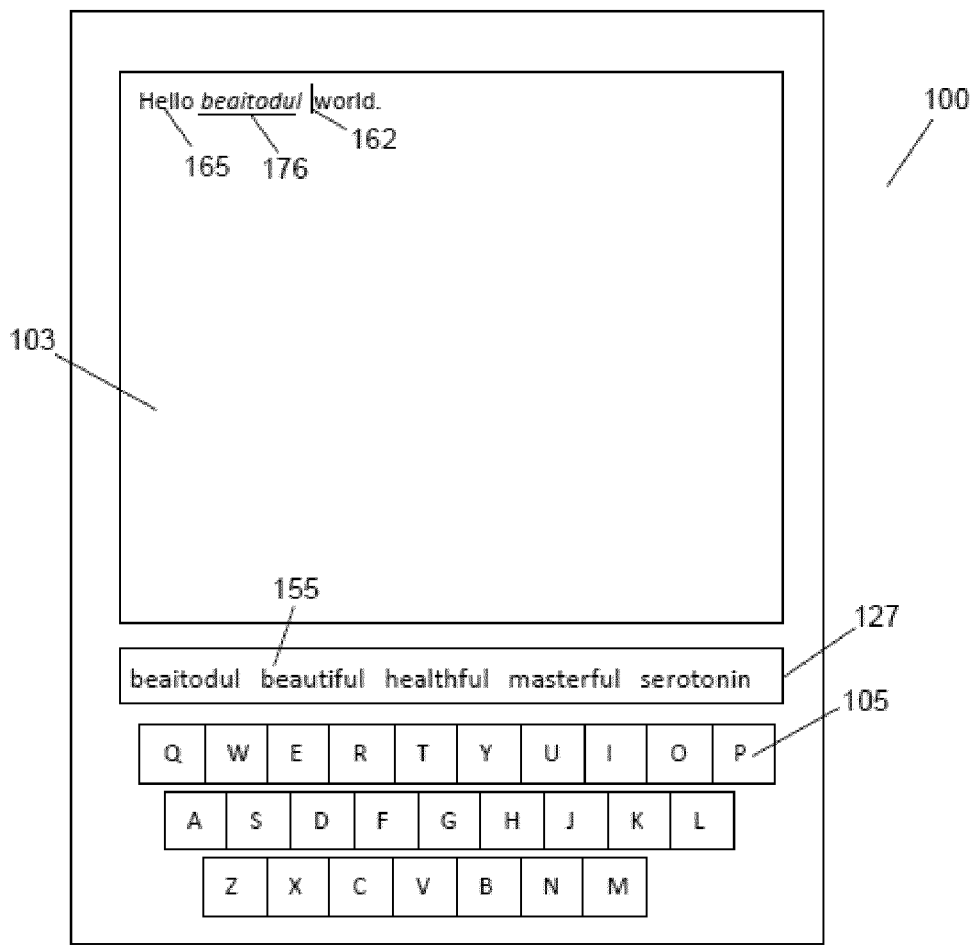

With reference to FIG. 12, the up swipe gesture can change the word "beautiful" 174 to the previous suggestion, which, in this case and since the system made the proper correction on the first try, the text that was actually typed, "beaitodul" 176 and the sentence is: "Hello beaitodul|world." The system can then move on to add additional text.

Dictionary Functions

Figure 13A:
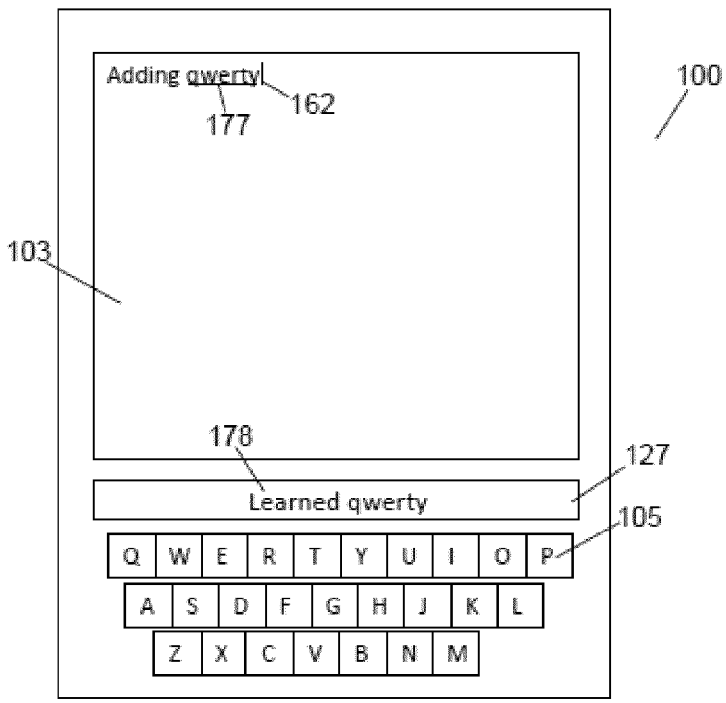
FIGS. 13A and 13B illustrate embodiments of the device performing dictionary control gesture functions.
Figure 13B:
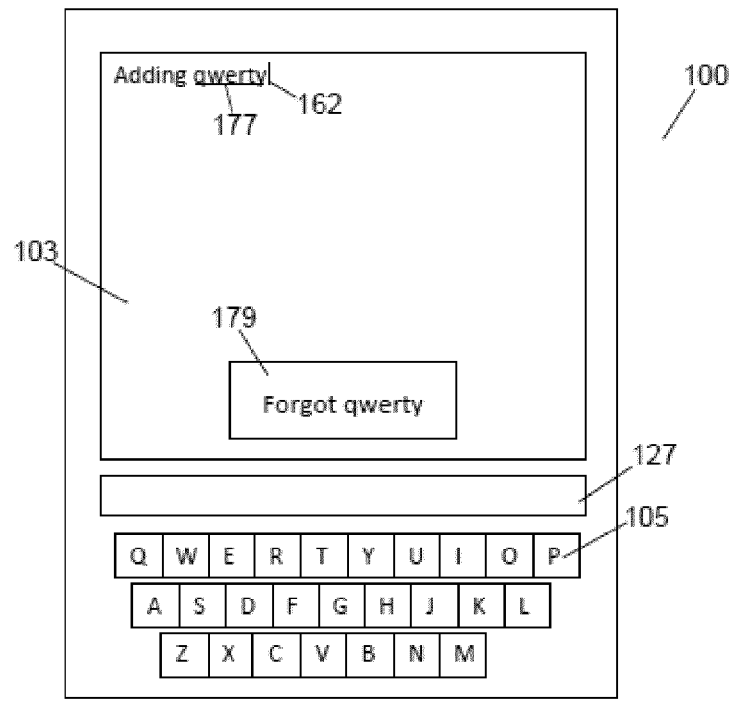

In an embodiment, the inventive system can be used to add and/or remove words from a system dictionary. With reference to FIGS. 13A-13B, a user has written the sentence, "Adding qwerty" and now wishes to add qwerty 177 to the dictionary. The exact user text input may always be the first item on the word correction suggestion list.

Since the word, "qwerty" 177 is currently at the first word of the system suggestion list, this text can be added to the diction by performing an up swipe in this context. With reference to FIG. 13A, the word "qwerty" 177 can be added to the dictionary. The system may provide a signal such as a display or an audio signal that the word has been added. In this example, the system displays the text, "Learned qwerty" 178 in the suggested word area 127. In some embodiments, though not shown in FIG. 13A, the system displays the text "Learned qwerty" 178 in the main text area. With reference to FIG. 13B, if another up swipe is performed again, the word qwerty can be removed from the dictionary and the system can display the text, "Forgot qwerty" 179 to confirm the deletion. In this example, the "Forgot qwerty" 179 message is displayed in the main text area. In some embodiments, though not shown in FIG. 13B, the system displays the text "Forgot qwerty" 179 in the suggested word area 127. Swiping up or down, can also move the cursor 162 to the end of the word qwerty 177.

Punctuation Marks

Figure 14:
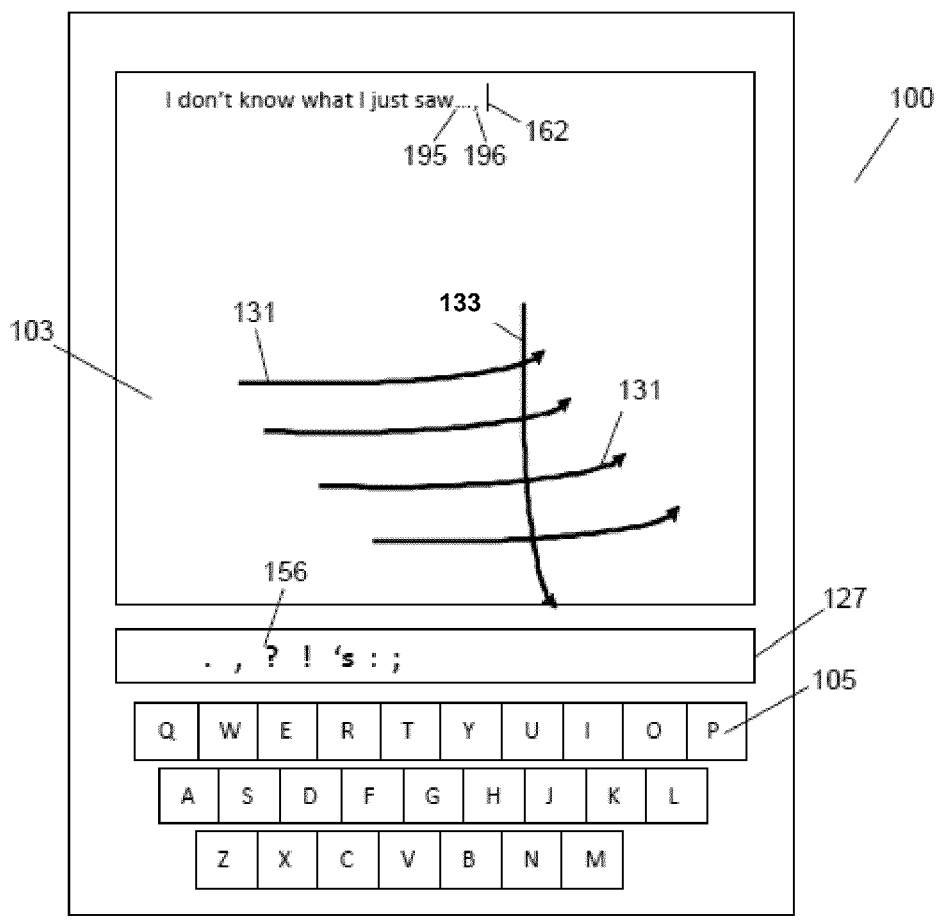
FIGS. 14-17 illustrate embodiments of the device performing punctuation gesture functions.

In addition to text, the inventive system can be used to input punctuation marks. As discussed, after a word has been input, the user can right swipe to add a space after the word. With reference to FIG. 14, the system may also interpret a subsequent right swipe gesture 131 (two right swipes 131) as a request to input a punctuation mark. For example, a right swipe 131 after a word has been input can cause a period "." 195 to be input and displayed after the last displayed word. The system can also add a space after the period. However, subsequent single finger right swipes 131 or a single finger right swipe 131 and hold can remove the space and cause additional periods 195 to be input and displayed as shown in FIG. 14. The next four right swipes cause four periods "...." 195 to be input.

Figure 15:
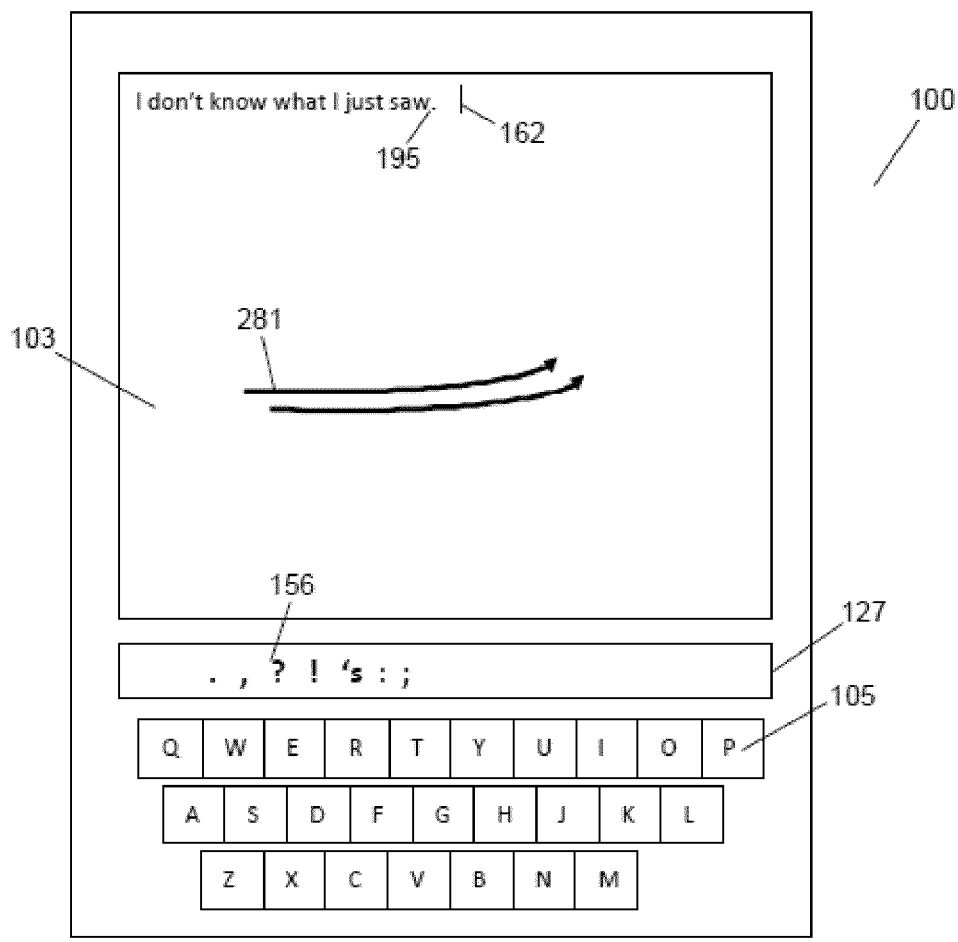

With reference to FIG. 15, in other embodiments, the system may use a different gesture to cause a punctuation mark to be added after the last input word "saw." For example, in an embodiment, single finger right swipes can cause the described word spelling correction and a completed word followed by a two finger right swipe 281 can cause the system to input a period "." 195 punctuation mark followed by a space.

In the suggested word section 127, a plurality of alternative punctuation marks 156 can be displayed such as: . , ? ! 's : ; . By inputting up and/or down swipe gestures as described above, the different punctuation marks can be selected and input. In the illustrated example, the user has typed, "I don't know what I just saw". The user then one finger or two finger right swiped 281 after the last word was input to indicate a punctuation mark. The user may wish to change the last period to a comma 196. Inputting a single down swipe 133 causes the last period "." 195 to be changed to a comma "," 196 as illustrated in FIG. 14.

Figure 16:
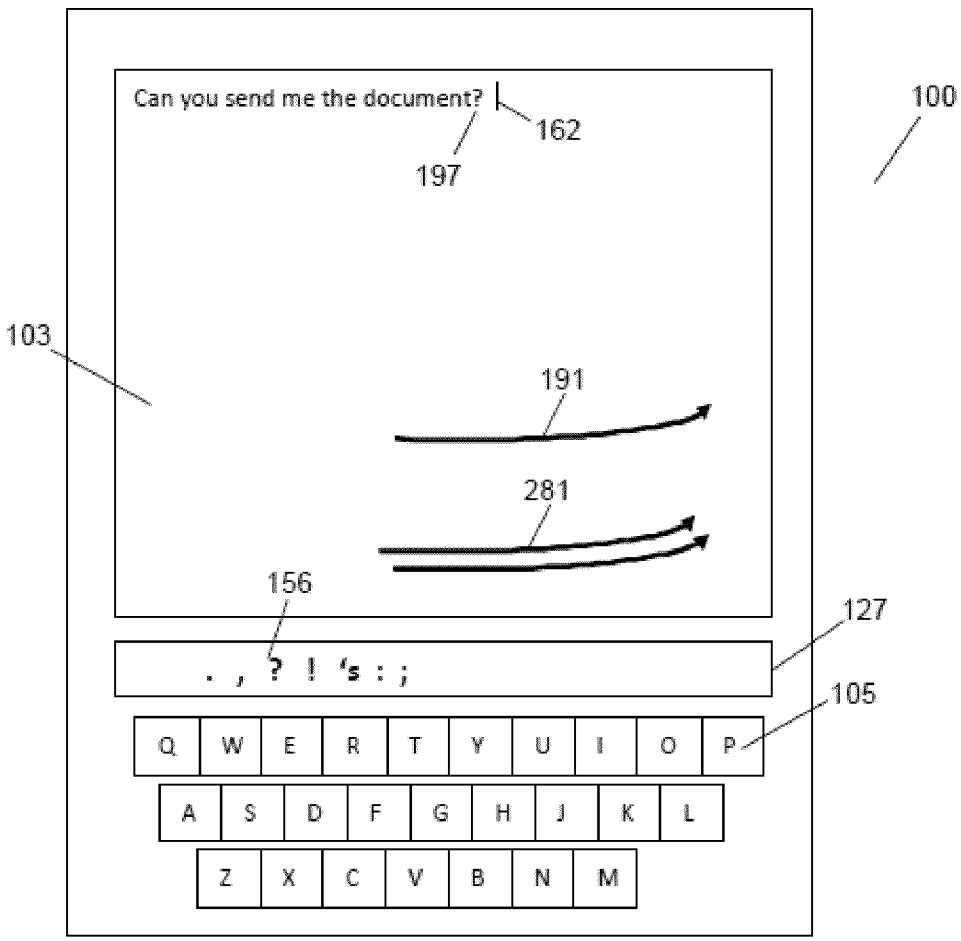

In general, a period is the normal input in response to two right swipe gestures. However, in other embodiments, the system may intelligently input a predicted punctuation mark based upon the context of the text. With reference to FIG. 16, the user has input the text, "Can you send me the document" followed by a single finger right swipe gesture 191 or a two finger right swipe gesture 281. The system can interpret the input text "Can you send me the document" as a question and respond to the single finger right swipe gesture 191 or two finger right swipe gesture 281 by inputting a question mark "?" 197 followed by a space.

In some embodiments the system can analyse the input words and determine that a question mark is the most appropriate punctuation mark. For example, sentences that start or include typical "interrogative words" such as: Which, How, What, Why Where, When, Will, Are, Can, Is, etc. can indicate that the sentence is a question. In an embodiment, the inventive system can detect the presence of interrogative words and may input a question mark "?" rather than a period "." in response to a punctuation mark gesture. If this is not what the user intended, the system can change the punctuation mark to any of the alternative punctuation marks 156 . , ? ! 's : ; with single finger up and/or down swipes as described above.

Figure 17:
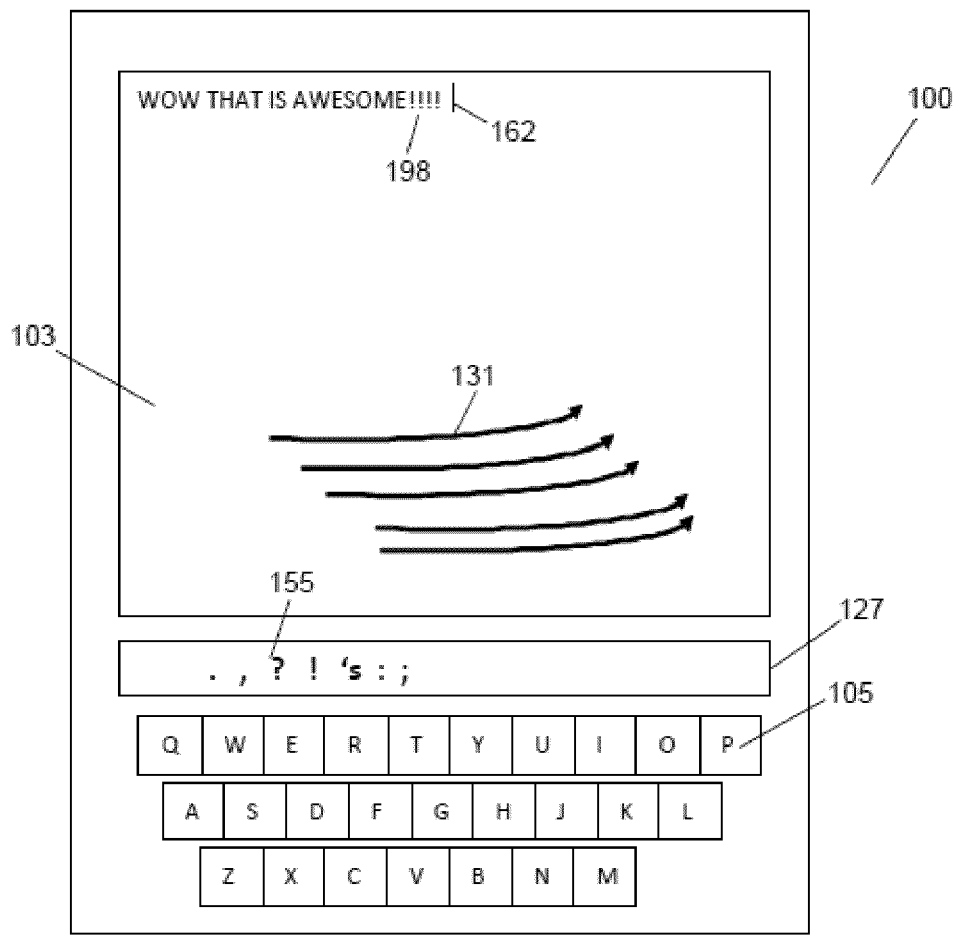

In another example shown in FIG. 17, the system may interpret text input in all capital letters and/or words that would be appropriate for use with an exclamation point. In this example, the input text is, "WOW THAT IS AWESOME" followed by a single finger right swipe gesture 131 or a two finger right swipe gesture 281. The system can interpret this text "WOW THAT IS AWESOME" context and determine that the most appropriate punctuation mark is an exclamation mark "!" 198 followed by a space. In yet another embodiment, the system can detect repeating the right swipe gestures 131, 281 and display repeated punctuation marks. In this example, the system can detect multiple right swipes 131, 281 after a complete sentence is detected, the system can display repeated exclamation marks "!" 198. The displayed text can be "WOW THAT IS AWESOME!!!!" in response to the described text input and a right swipe 131, 281 followed by four repeated right swipes 131, 281. In another embodiment, a right swipe and hold gesture can cause the system to remove the space and repeating the input of the prior punctuation mark.

Repeat Input Gestures

In an embodiment, the user can alter the right swipe gesture by holding the end of the swipe rather than releasing after the swipe. For example, the right swipe and hold can include touching the touch screen and sliding the finger across the surface and holding the finger against the surface at the end of the right swipe. As discussed above, the right swipe can cause various commands to be detected by the system. The repeated action can be based upon the last right swipe input. For example, if the last input was a space, the swipe and hold gesture can result in inputting multiple spaces. Alternatively, if the last input was a period, "." the swipe and hold gesture can result in inputting multiple periods. The rate of repetition of the input can vary with the duration of the hold gesture. For instance, the input rate of spaces or periods as described could happen faster the longer the user continues the hold gesture.

Deletions

In an embodiment, the present invention allows the user to actuate a delete function through an input gesture. The delete function can be either a letter or the entire word based upon the context of the input text and/or position of the cursor relative to the text as described in FIGS. 18-21. In order to distinguish the deletion of a letter or a word, the system may only perform the letter delete function when the user has performed a left swipe while in the middle of inputting a word. When the word is not complete and/or not recognized as a full word by the system, each left swipe may have the effect of removing a single text character.

Figure 18:
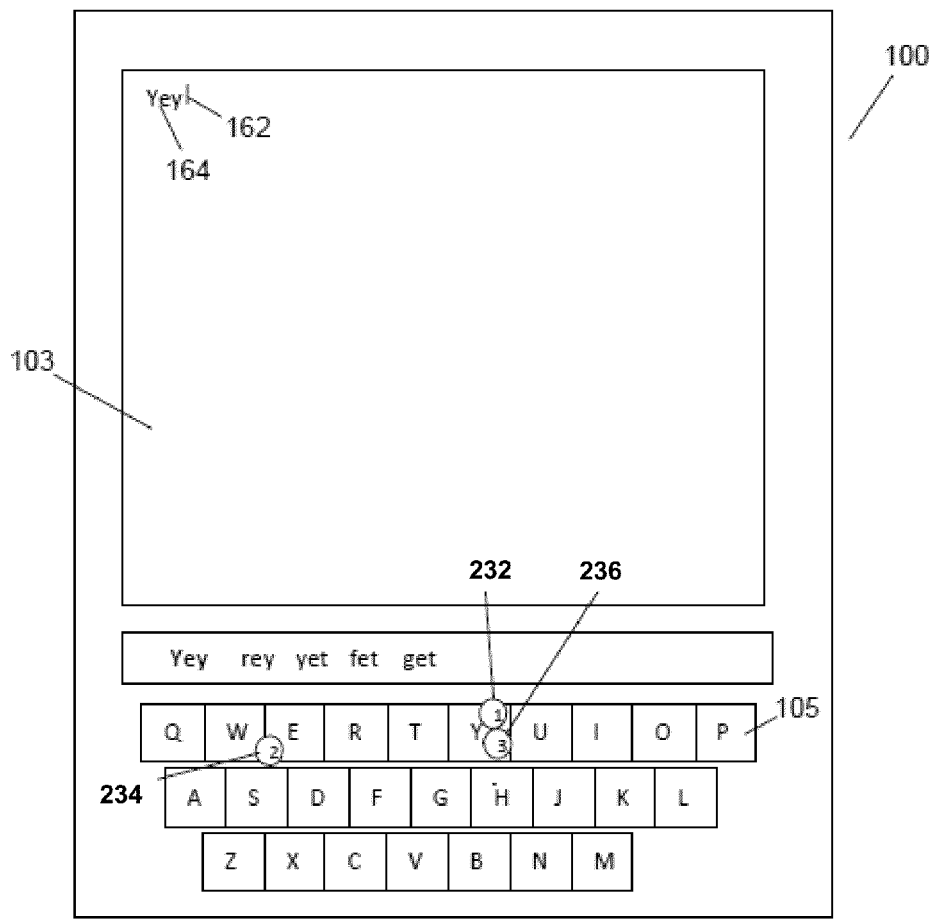
FIGS. 18-21 illustrate letter deletion and word deletion gesture functions.
Figure 19:
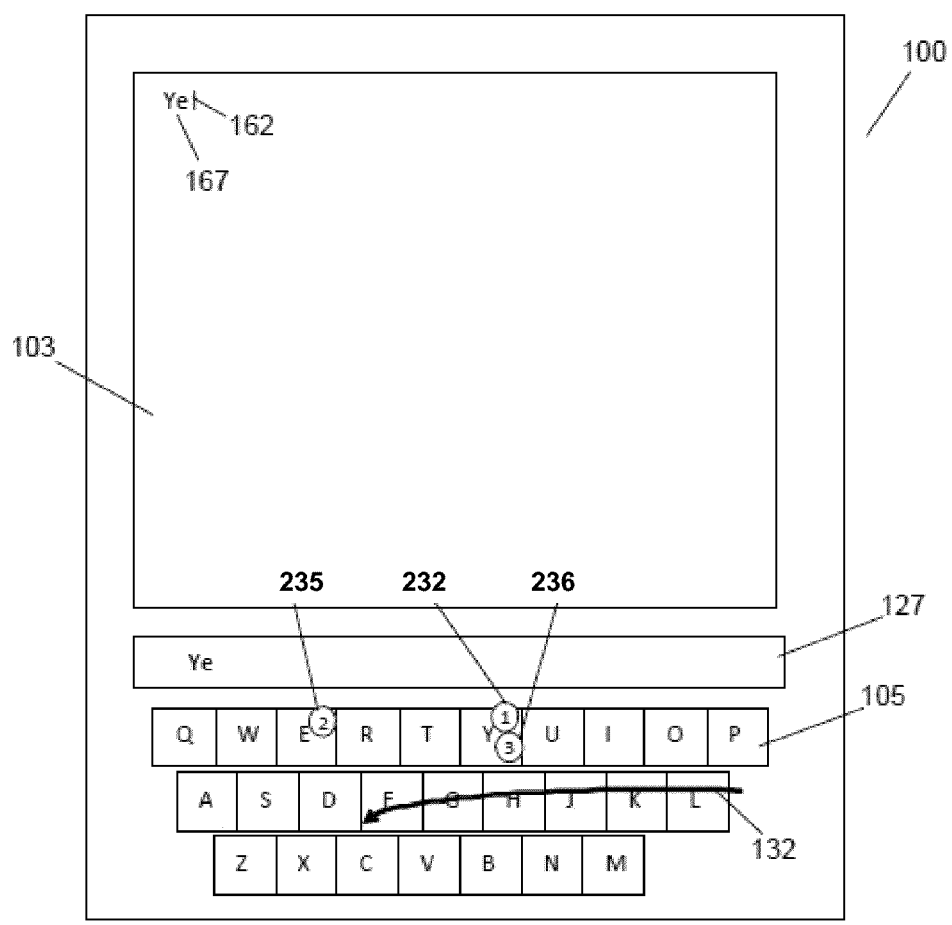
Figure 20:
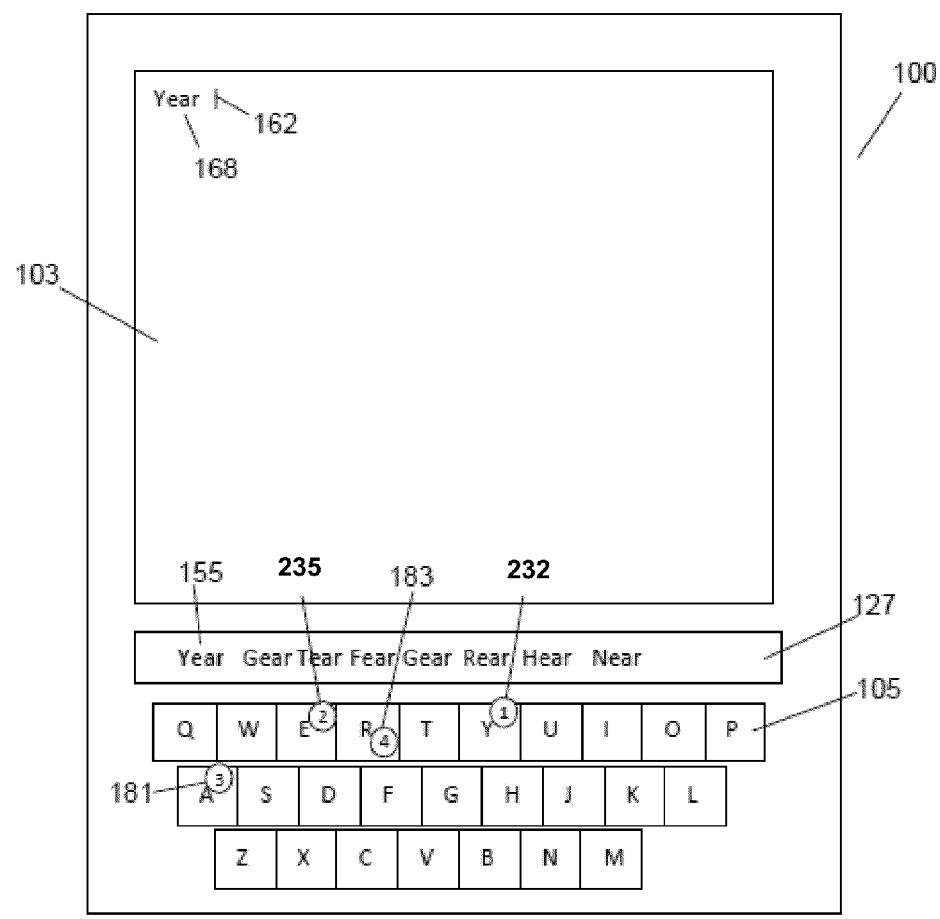
Figure 21:
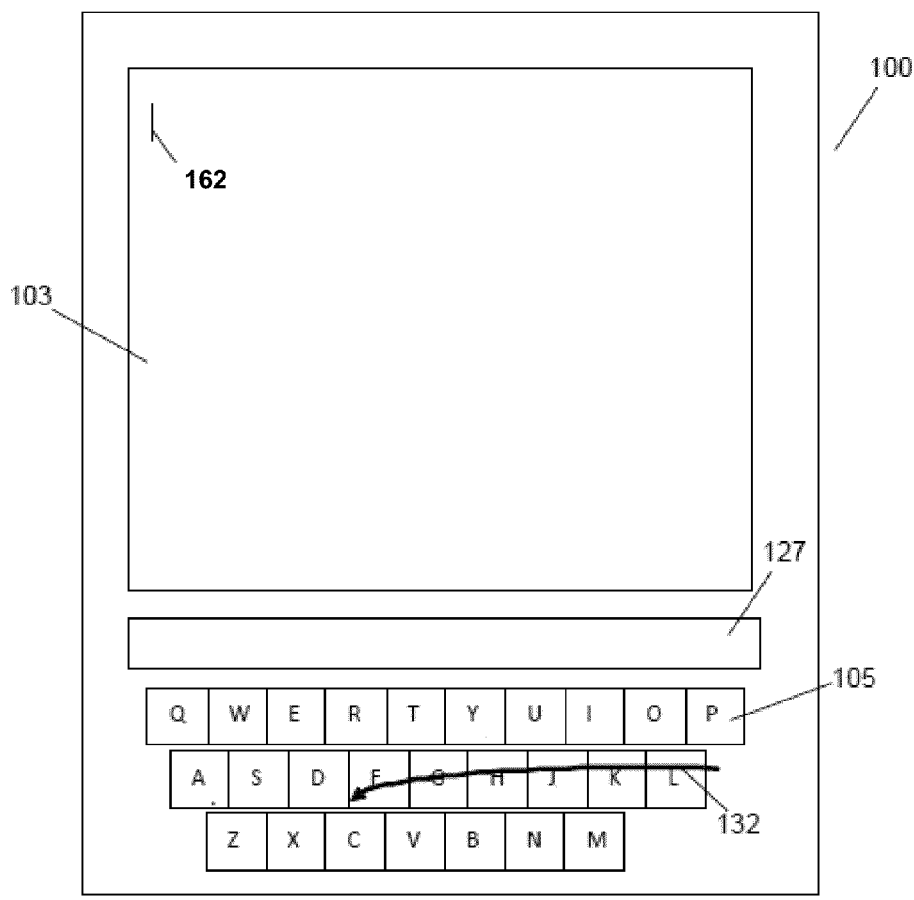

In the example shown in FIG. 18, the user has typed the text, "Yey" 164 by tapping on points (1) 232, (2) 234, and (3) 236 corresponding to the letters "y", "e", and "y" respectively. The cursor 162 is adjacent to the last y. The user has then input a single finger left swipe 132 which removed the last y and changed the text to "Ye" 167 as shown in FIG. 19. However with reference to FIGS. 20 and 21, when the left swipe is performed after a complete word has been input, the system can delete the whole of that preceding word. FIG. 20 shows a device 100 with the word, "Year" 168 input and a space is placed between the word "Year" 168 and cursor 162. The user performs a left swipe 132 and the entire word "Year" is deleted as shown in FIG. 21. Thus, the system can automatically determine if the single letter backspace or full word delete function should be applied to the left swipe gesture 132 based upon the context of the input.

While the user is typing a word, he or she may tap and input an incorrect letter. Because the user is in the process of typing the word, the cursor can be located directly adjacent to the last input letter. The user can notice this error and input a left swipe gesture 132. The system can detect the gesture and the position of the cursor next to a letter. Based upon this context, the system can remove a single letter to the left of the cursor. If additional left swipe gestures are detected, an additional letter for each swipe can be deleted. After making the correction described above with reference to FIGS. 18 and 19, the user may then tap on points (3) 181 and (4) 184 corresponding to the letters "a" and "r" respectively as shown in FIG. 20. The output is manually corrected to add onto points "Y" (1) 232 and "e" (2) 235, followed by (3) 181 and (4) 184 corresponding to letters "a" and "r" and resulting in the text "Year" 168 shown in the display 103.

In some embodiments, the system may enable a "continuous delete" function. The user may invoke this by performing a combination gesture of a left swipe and a hold gesture at the end of the left swipe. The function will have the effect of the left swipe, performed repeatedly while the user continues holding his finger on the screen at the end of the left swipe (i.e. while the swipe and hold gesture is continuing). The repetition of deletions could vary with the duration of the gesture. For instance, deletions could happen faster the longer the user has been continuing the gesture. If the delete command is a single letter delete backspace, the deletion may start with single character by character deletions and then progressing to delete whole words after a predetermined number of full words have been deleted, for example one to five words. In the single letter and full word delete modes, each of the letters and words may be deleted at a predetermine rate of time between each letter or word deletions. However, as more letter or words are deleted, the system can increase the speed which the letters or words are deleted.

Word Prediction

Figure 22:
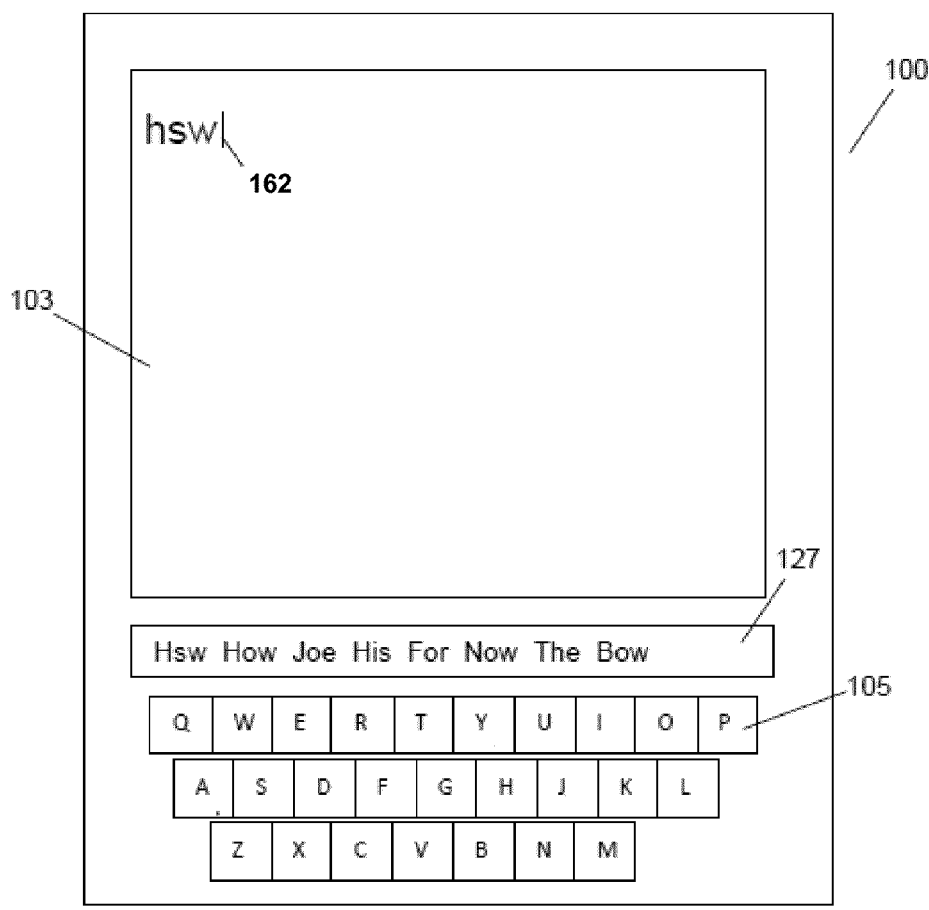
FIGS. 22-28 illustrate embodiments of text input, word correction, word prediction and punctuation mark input gestures.

In an embodiment, the inventive system can use at least some of the described gestures to perform "word prediction" processing. This feature can be particularly useful with smart watch embodiments where individual letter input can be more difficult than devices having larger touch screens. With reference to FIG. 22, the user has typed the input text "hsw". The system can respond to this input text by recognizing that these letters are not a word and suggesting a set of possible corrected words "Hsw How Joe His For Now The Bow" listed in the suggested word section 127. The first suggested word "How" can be in bold to indicate that it is the current selected recommended replacement word.

Figure 23:
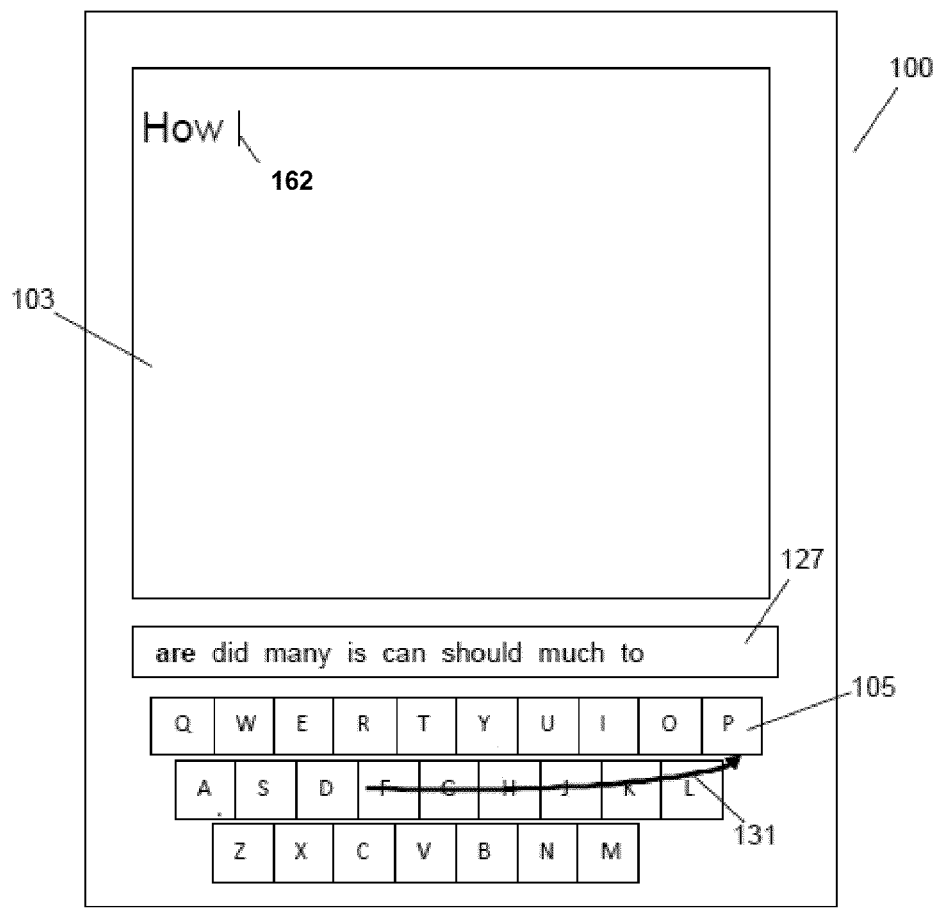

In an embodiment, with reference to FIG. 23, the user can then perform a single finger right swipe gesture 131 to choose the first recommended replacement word "How" and inputting a space after the input replacement word. The system has input a new set of suggested predicted words in the suggested word section 127 which in this embodiment include, "are did many is can should much to." In an embodiment, the inventive system can perform the illustrated subsequent word prediction through an n-gram prediction process. In a simplified embodiment, the inventive system can have a database which stores a bigram which provides a probability or frequency of two word combinations. A portion of the bigram is represented by Table 1 below. In FIG. 23, the predicted words can be displayed in descending order of probability that the word combination is the predicted word to be input. The bigram for the first word How can extend beyond the eight predicted words in Table 1 and these additional predicted words can be displayed in the suggested word area 127 by performing the up and/or down swipes described above.

TABLE 1

| Word Combination | | | | | | | |
|---|---|---|---|---|---|---|---|
| How are | How did | How many | How is | How can | How should | How much | How to |
| Frequency 1,000 | 741 | 573 | 447 | 303 | 278 | 193 | 54 |

In other embodiments, the inventive system can utilize one or more of: bigram, trigram, quadgram or n-gram word prediction systems that would use tables having frequencies or probabilities for word combinations for three or more word text sequences. The n-gram word predictions can use a universal database for all users or alternatively, the system can use databases that are customized for one or more specific users based upon the statistical analysis of the users' prior writings. In other embodiments, any other suitable word prediction system can be used by the system.

Figure 24:
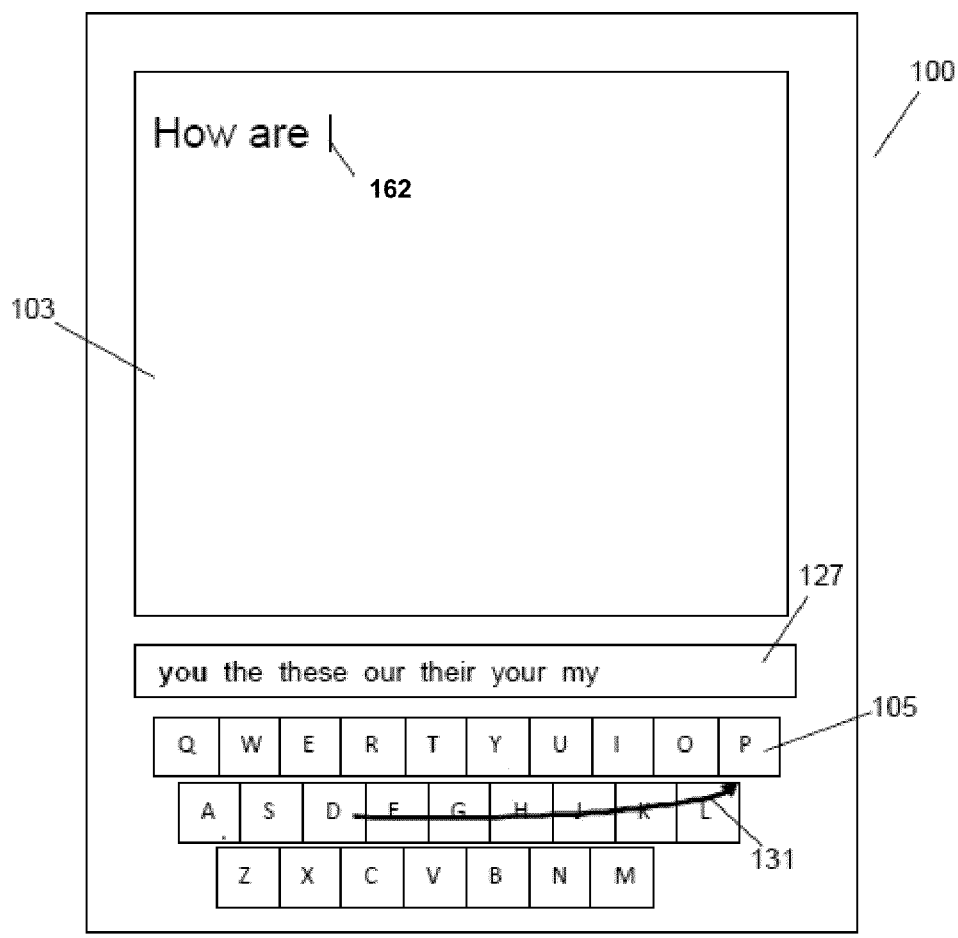
Figure 25:
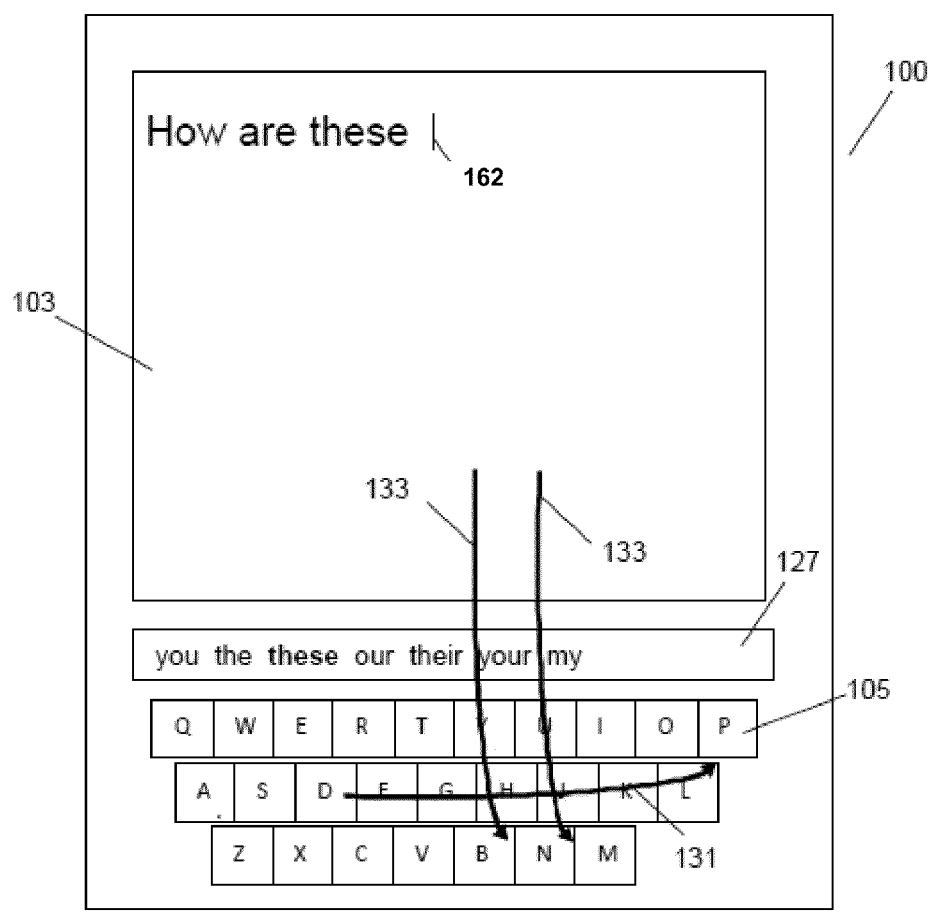

With reference to FIG. 24, the user has reviewed the suggested words and agreed with the system's first predicted word "are" by inputting a single finger right swipe 131. The system inputs the word "are" followed by a space. The system has also displayed a next set of predicted words, "you the these our their your my" in the suggested word section 127. Again, the displayed predicted words can be based upon an n-gram prediction process such as a bigram or a trigram an example of which is below in Table 2. With reference to FIG. 25, the user may disagree with the first predicted word "you" but see the desired word in the suggested word section 127. The user may input two down swipes 133 to change the selected word to "these" which is added to the displayed word sequence. The user can finalize the selection of the suggested word "these" with a right swipe gesture 131 which also causes a space to be input after the last input word.

TABLE 2

| Word Combination | | | | | | | |
|---|---|---|---|---|---|---|---|
| How are you | How are the | How are these | How are our | How are their | How are your | How are my |
| Frequency 1,320 | 771 | 637 | 619 | 428 | 403 | 92 |

Figure 26:
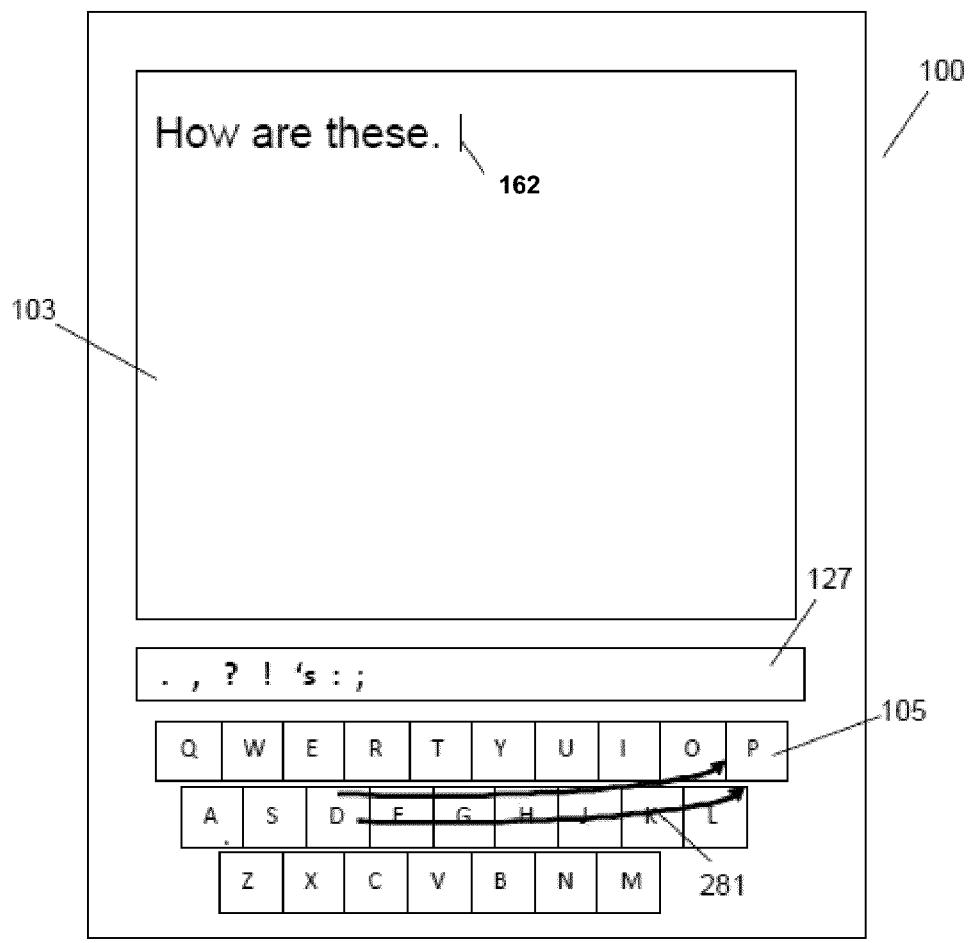
Figure 27:
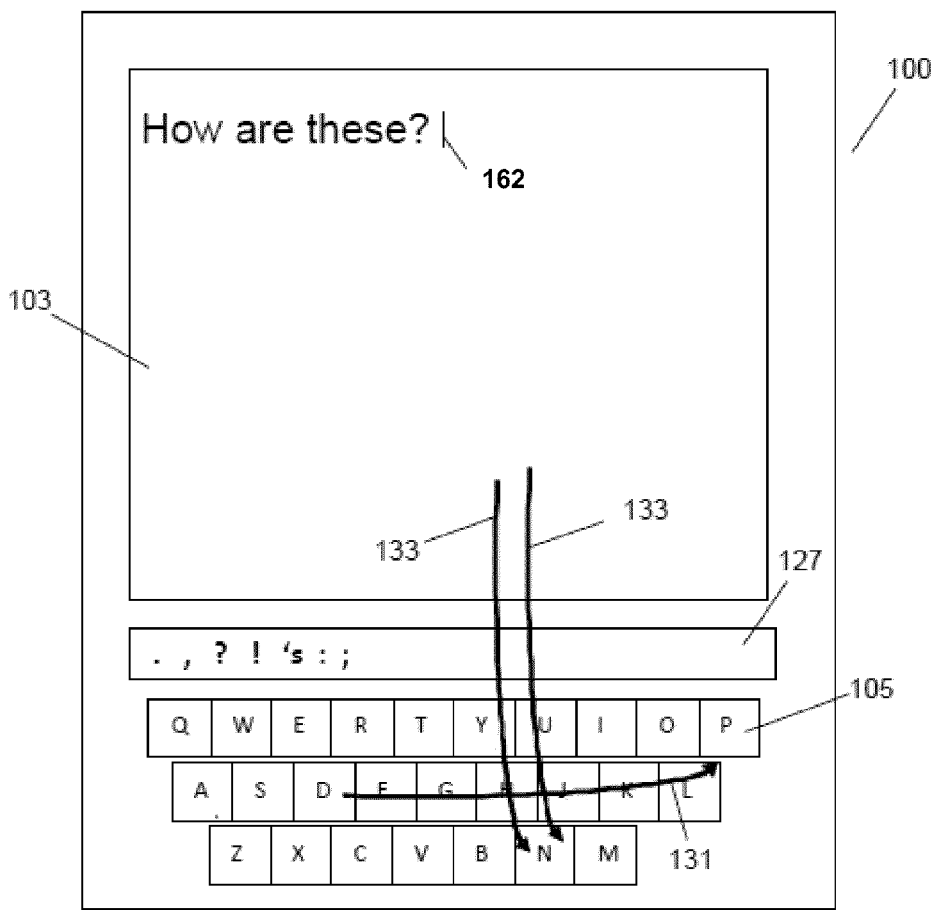

With reference to FIG. 26, the user may wish to finish this sentence and can input a two finger right swipe 281 which can cause a period "." to be input. However, the user may want a question mark instead. With reference to FIG. 27, the user can input two single finger down swipes 133 which can cause the selected punctuation mark to move two to the right from "." to "?" in the selected punctuation mark section 127. The user can finalize this selected "?" punctuation mark with a right swipe 131 or by inputting text letter taps. As discussed above, in some embodiments the system can analyse the input words and determine that a question mark is the most appropriate punctuation mark. For example, sentences that start or include typical "interrogative words" such as: Which, How, What, Why Where, When, Will, Are, Can, Is, etc. can indicate that the sentence is a question. In an embodiment, the inventive system can detect the presence of interrogative words and may automatically input a question mark "?" rather than a period "." in response to a punctuation mark gesture. Although the punctuation mark input has been described as a single or two finger right swipe gesture, in other embodiments the inventive system can input the punctuation mark in response to any other suitable detected gesture input.

Figure 28:
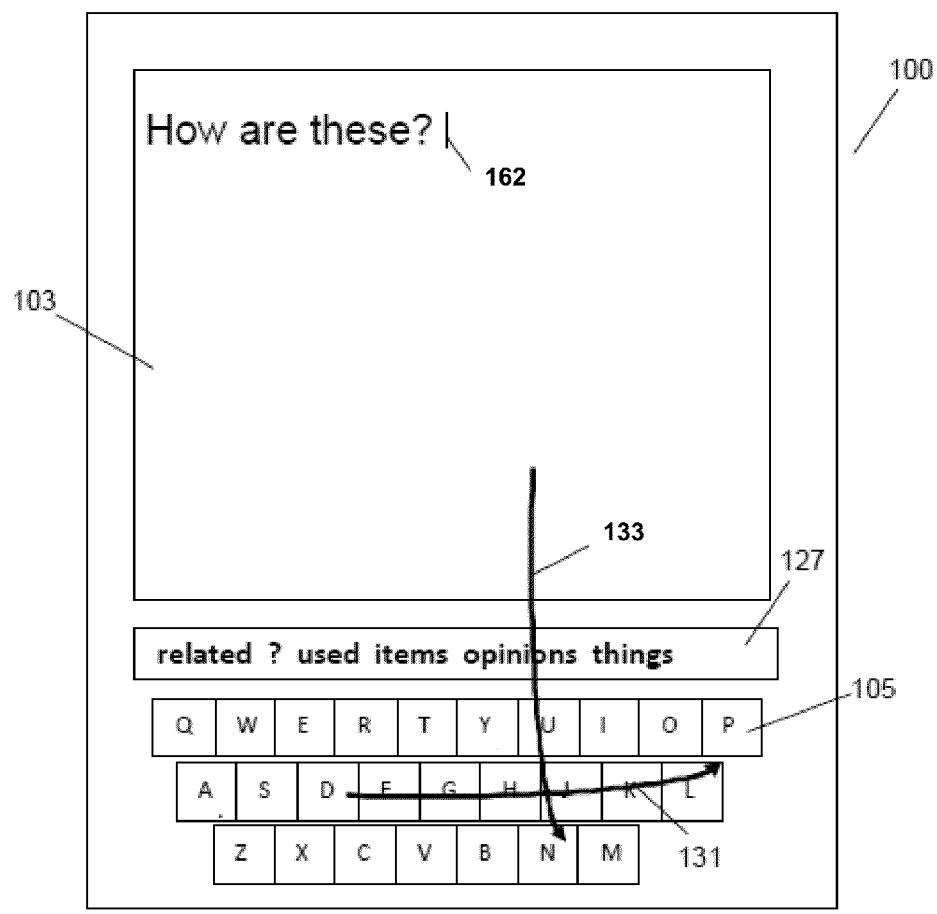

In yet another embodiment, the question mark may be part of the suggested "words" based upon an n-gram word prediction. For example, with reference to FIG. 28, the system can display a mixed group of predicted words and punctuation marks in the suggested word area 127. For example, in an embodiment, the system may respond to the text input, "How are these " by displaying a set of next suggested words that include both words and at least one punctuation mark. In this example, the system displays, "related ? used items opinions things". The user can then input a single finger down swipe 133 to switch the suggested word from "related" to "?" in the suggested word area 127 and the input text. The user can then input a right swipe 131 to input the "?" followed by a space. The system can repeat the described process for the next sentence.

In this embodiment, the system may use a bigram, trigram or quadgram analysis as shown in Table 3 that includes both words and the question mark punctuation mark.

TABLE 3

| | Word Combination | | | | |
|---|---|---|---|---|---|
| How are these related | How are these? | How are these used | How are these items | How are these opinions | How are these things |
| Frequency 653 | 551 | 498 | 451 | 308 | 9 |

The n-gram can be based upon a cumulative writings of many authors and documents. In other embodiments, the n-gram analysis can be based upon a smaller group of documents from a limited number of writers. In yet another embodiment, the system may produce the n-gram analysis based upon the prior writings of the author.

Keyboard Functions

In some embodiments, gestures may invoke different keyboards in a repeating rotation. For example, system may include multiple keyboards which can be changed by the user. The "normal" letter character keyboard may be the default keyboard. The normal keyboard can be changed to a numeric keyboard, which may in turn be changed to a symbol keyboard. The system may include any number of additional keyboards. In an embodiment, the inventive system may include dedicated keyboard buttons that can be used to change the keyboard. The keyboard switching cycle can be repeated as necessary. In an embodiment, the user can configure the system to include any type of keyboards. For example, there are many keyboards for different typing languages.

Figure 29:
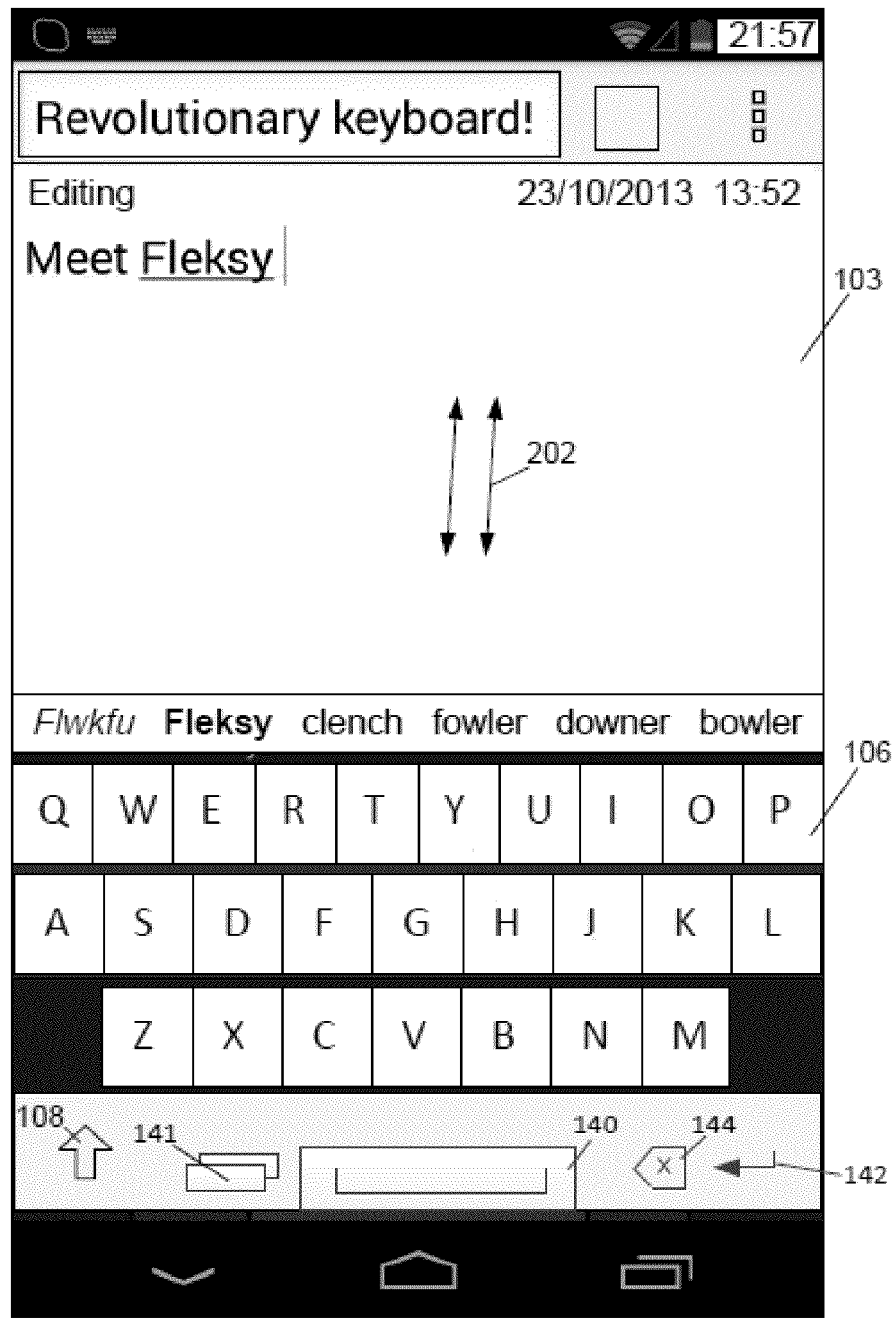
FIGS. 29-34 illustrate letter keyboard and displayed layout gesture functions.

In different embodiments, the system can recognize certain gestures for quickly changing the layout of the keyboard and/or invoking settings menus. For example, a two finger up/down swipes may be used to scroll through alternative keyboards layouts. With reference to FIG. 29, an embodiment of a full keyboard 106 is illustrated that includes all letters in a QWERTY layout and below the keyboard are buttons for: shift 108, keyboard toggle 141, space 140, backspace 144 and new line 142. This keyboard layout can also include icons for UI notification.

Figure 30:
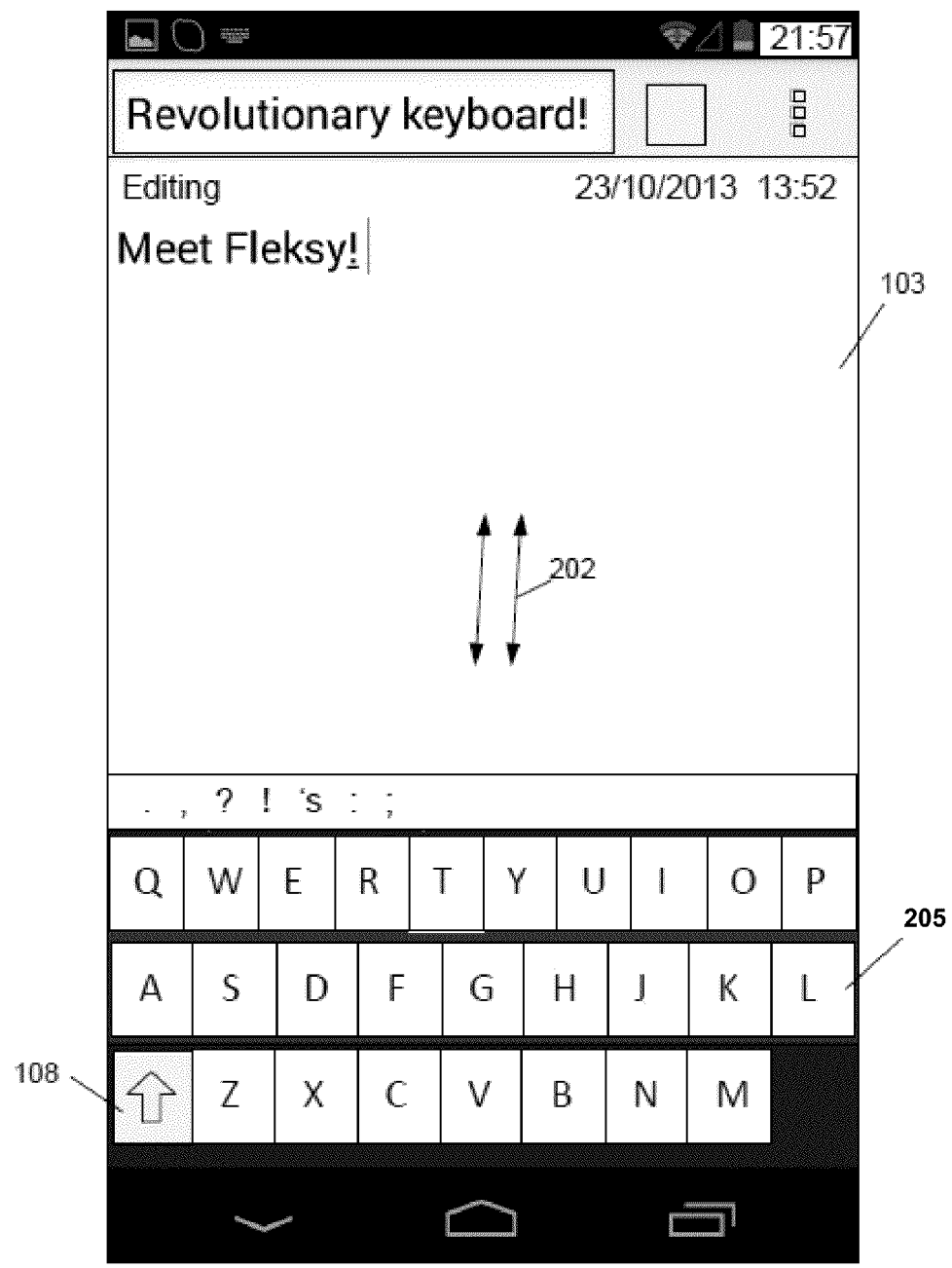
Figure 31:
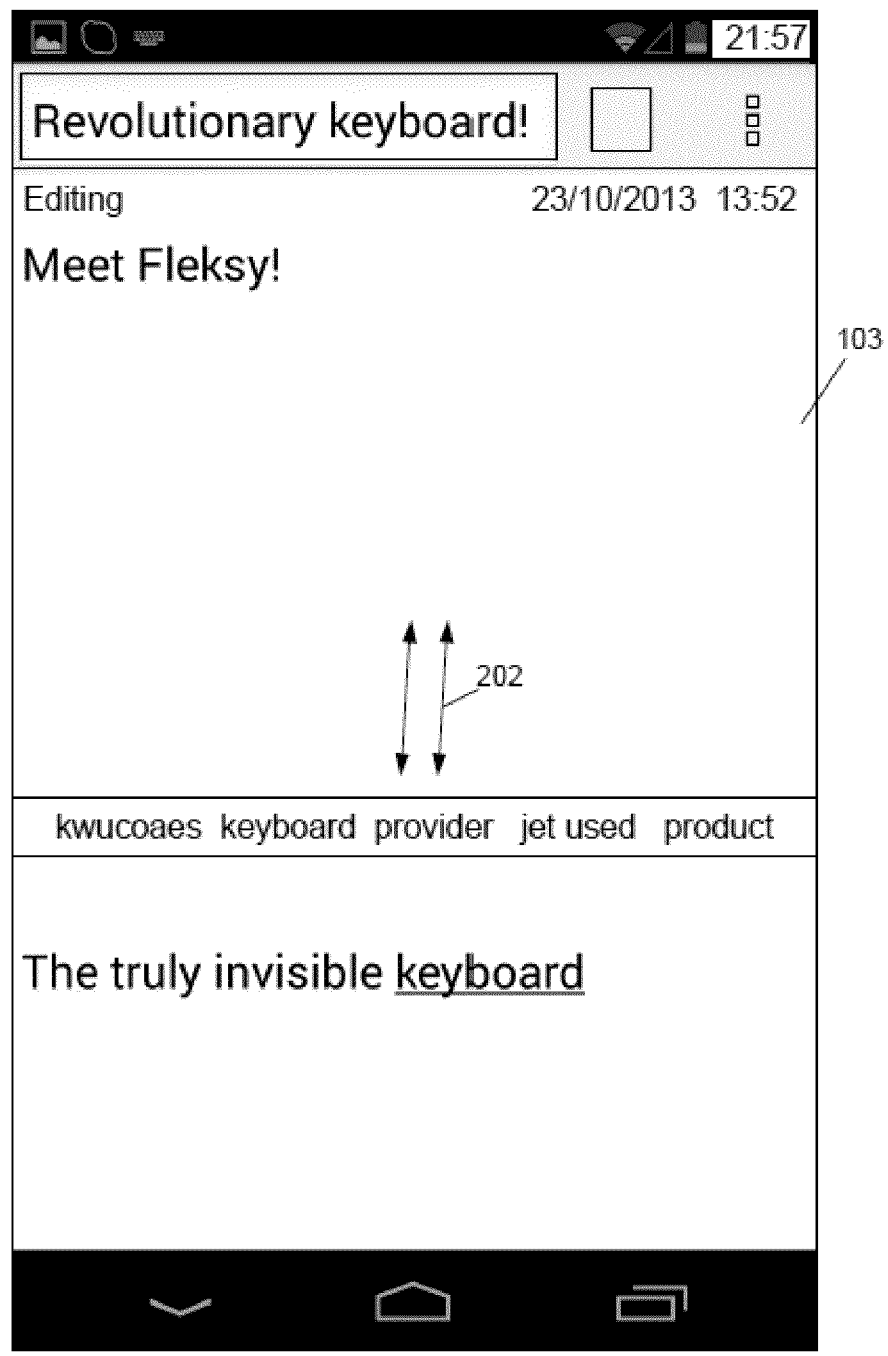
Figure 32:
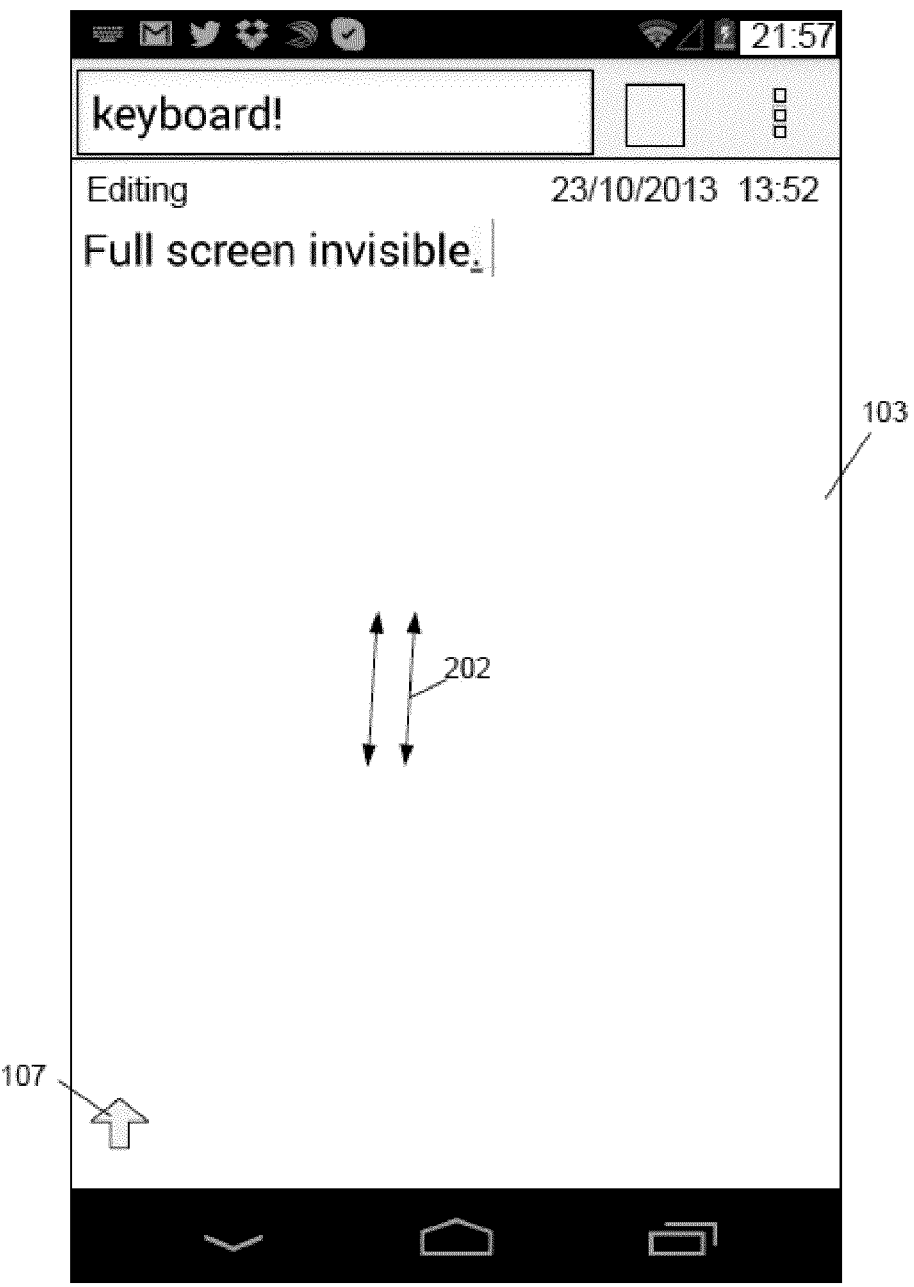

In an embodiment of the inventive system, the user can scroll through the keyboard layouts with two finger up/down swipes 202 on the touch screen 103, the system can display alternative keyboard layouts. With reference to FIG. 30, an alternative keyboard 105 layout with the first row of keys below bottom letter row removed. In this example, the shift key 108 has been moved next to the "Z" key. With reference to FIG. 31, the next alternative keyboard can be an invisible keyboard. In this example the letters, shift, keyboard, space, backspace and new line have all been removed. The only visual graphics include the word suggestion bar and some UI notifications and animations which can indicate controls such as shift. With reference to FIG. 32, the next keyboard is even more minimal with the word suggestion bar removed and just some animations and UI notifications still visible. In this example, the shift key UI notification 107 is shown which indicates that the shift key has been actuated and the next input letter will be a capital letter. The system can scroll through all of the possible keyboards in a loop and back to the initial keyboard as shown in FIG. 29 with repeated two finger up/down swipes.

Figure 33:
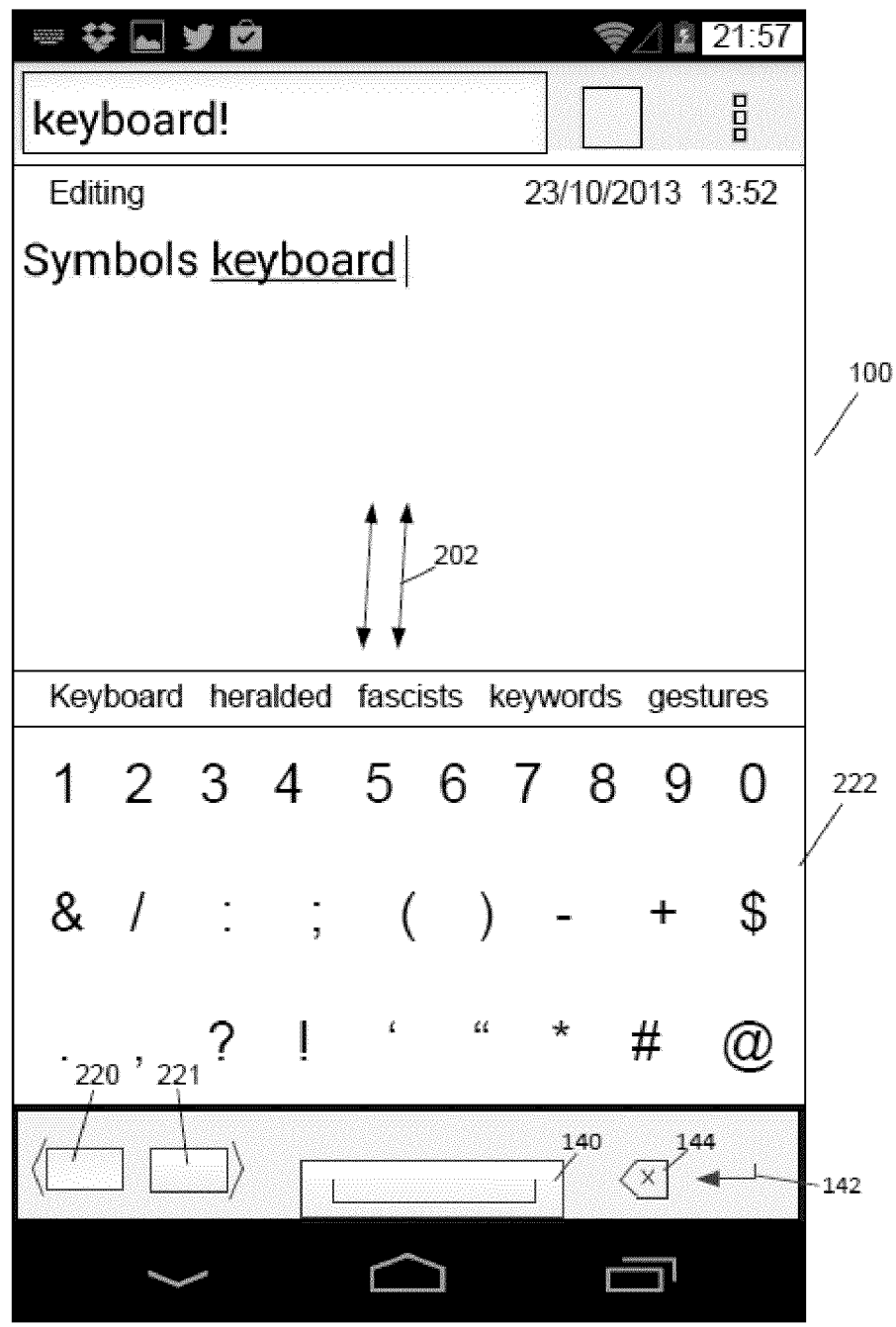
Figure 34:
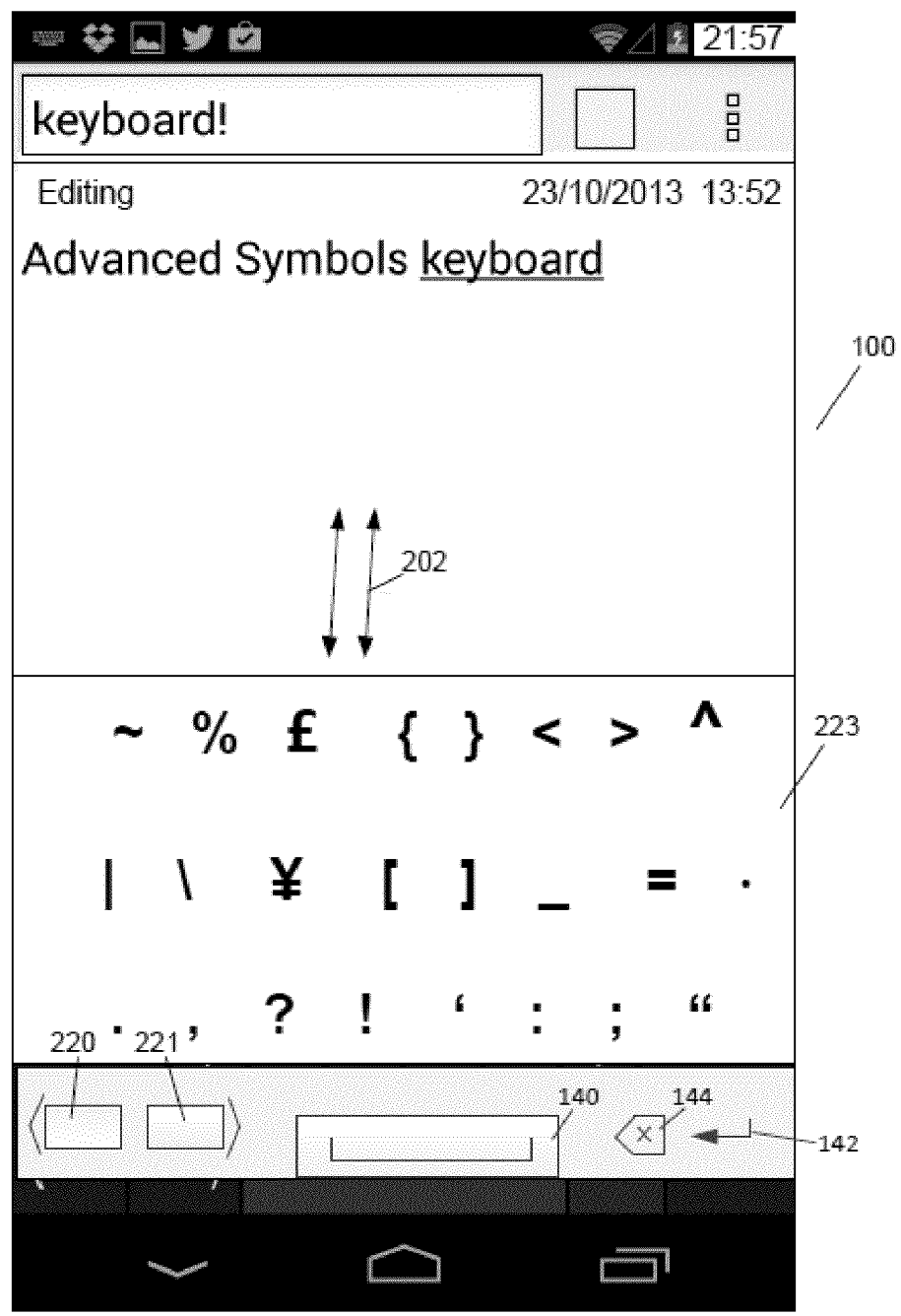

As discussed above, the system can include a "keyboard toggle." In an embodiment, pressing the keyboard toggle causes the keyboard to switch or scroll through a series of alternative keyboards. With reference to FIG. 33, a second keyboard can be a first symbols keyboard 222. With reference to FIG. 34, a third keyboard can be displayed which can be an advanced symbols keyboard 223. The alternative keyboards can include a "left arrow keyboard" button 220 and a "right arrow keyboard" button 221. The user can click the left arrow keyboard 220 to go the prior keyboard and the right arrow keyboard button 221 to go to the next keyboard.

In other embodiments, the type of the swipe may control the way that the keyboard is changed by the system. For example, from a text keyboard, two finger right/left swipes may invoke different language keyboards. Similarly, from a symbols keyboard, two finger right/left swipes may invoke different symbol keyboards. Again, these multiple keyboards can be configured in a loop so that each of the keyboards can be accessed through repeated two finger swipes in one direction.

Many mobile devices are small enough to be held with one hand. Thus, the user will typically hold the device and input text with a thumb. If the mobile device is large and the user's hand is small, it can be difficult for a right thumb to touch the left side of the mobile device or a left thumb to accurately touch a right side of the mobile device. In an embodiment, the inventive system can be used to alter the left/right position of the keyboard on the touch pad of the mobile device to a position and scale that is most comfortable to the user. The system may be in a normal text input mode with the keyboard aligned with the middle of the display. The user can input a two finger right swipe 281 and the system can respond by moving compressing the keyboard to the right side of the display. The system can display the compression of the keyboard during the swipe so the user can easily control the level of compression can be based upon the length of the swipe.

Figure 35:
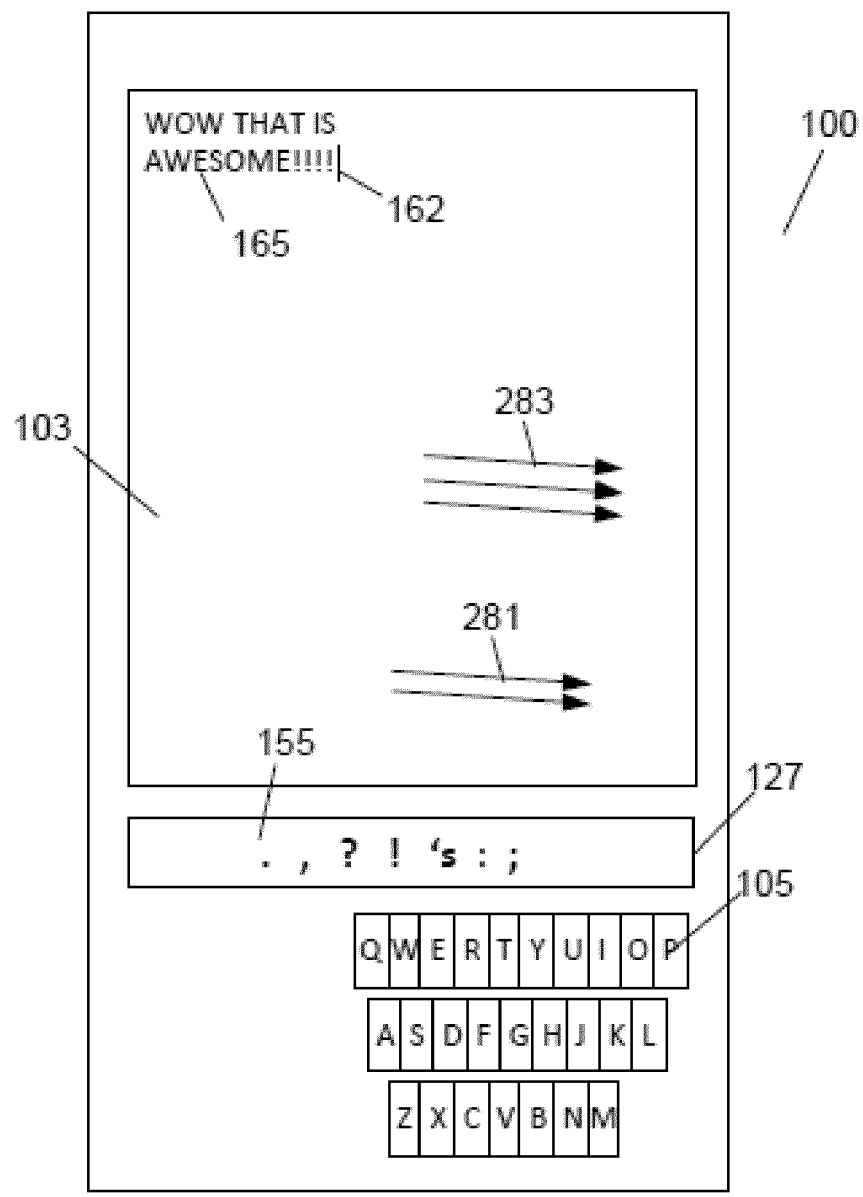
FIG. 35 illustrates a right side keyboard compression gesture.
Figure 36:
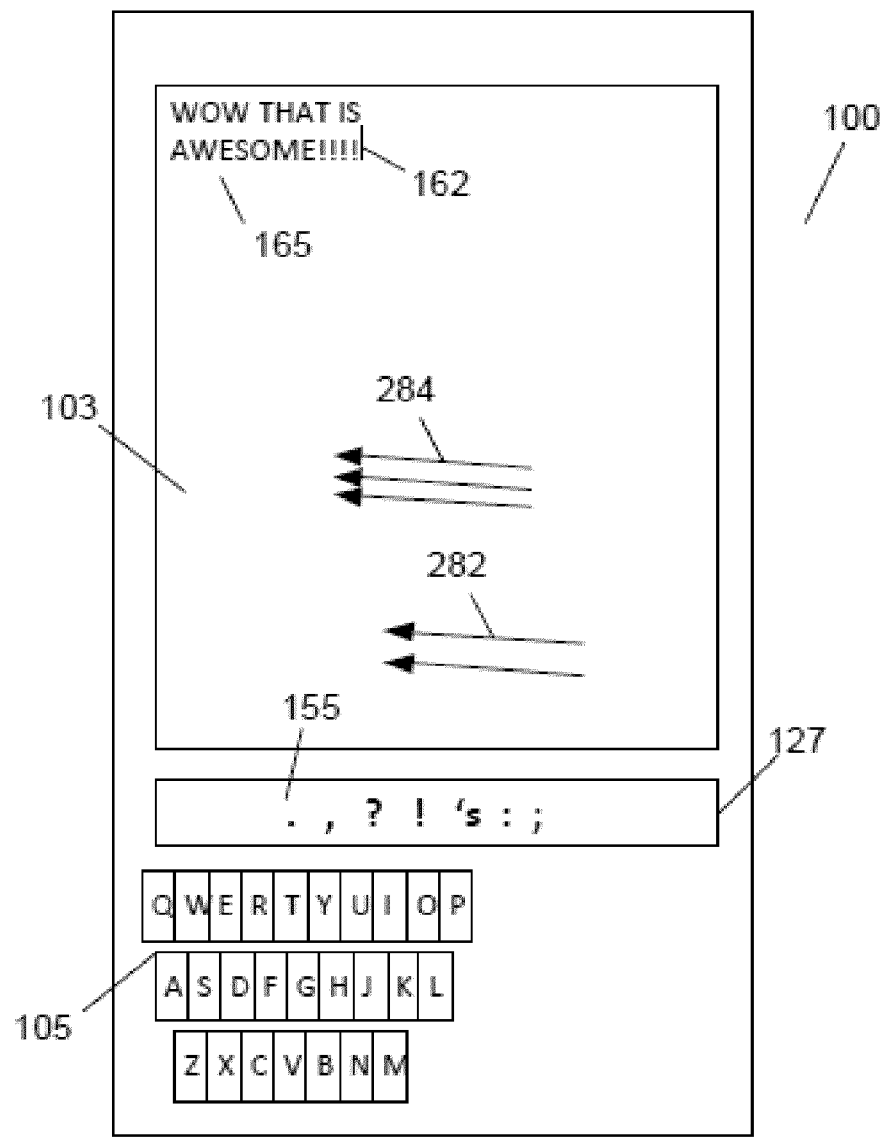
FIG. 36 illustrates a left side keyboard compression gesture.

With reference to FIG. 35, a two finger right swipe 281 can cause the keyboard to compress against the right side of the display 103. In an alternative embodiment, a three finger right swipe 283 may be used to cause the keyboard to compress against the right side of the display 103. This can allow for easier and more comfortable typing for right handed users. With reference to FIG. 36, a two finger left swipe 282 or alternatively a three finger left swipe 284 can cause the keyboard to compress against the left side of the display 103.

Smart Watch Applications

Figure 37:
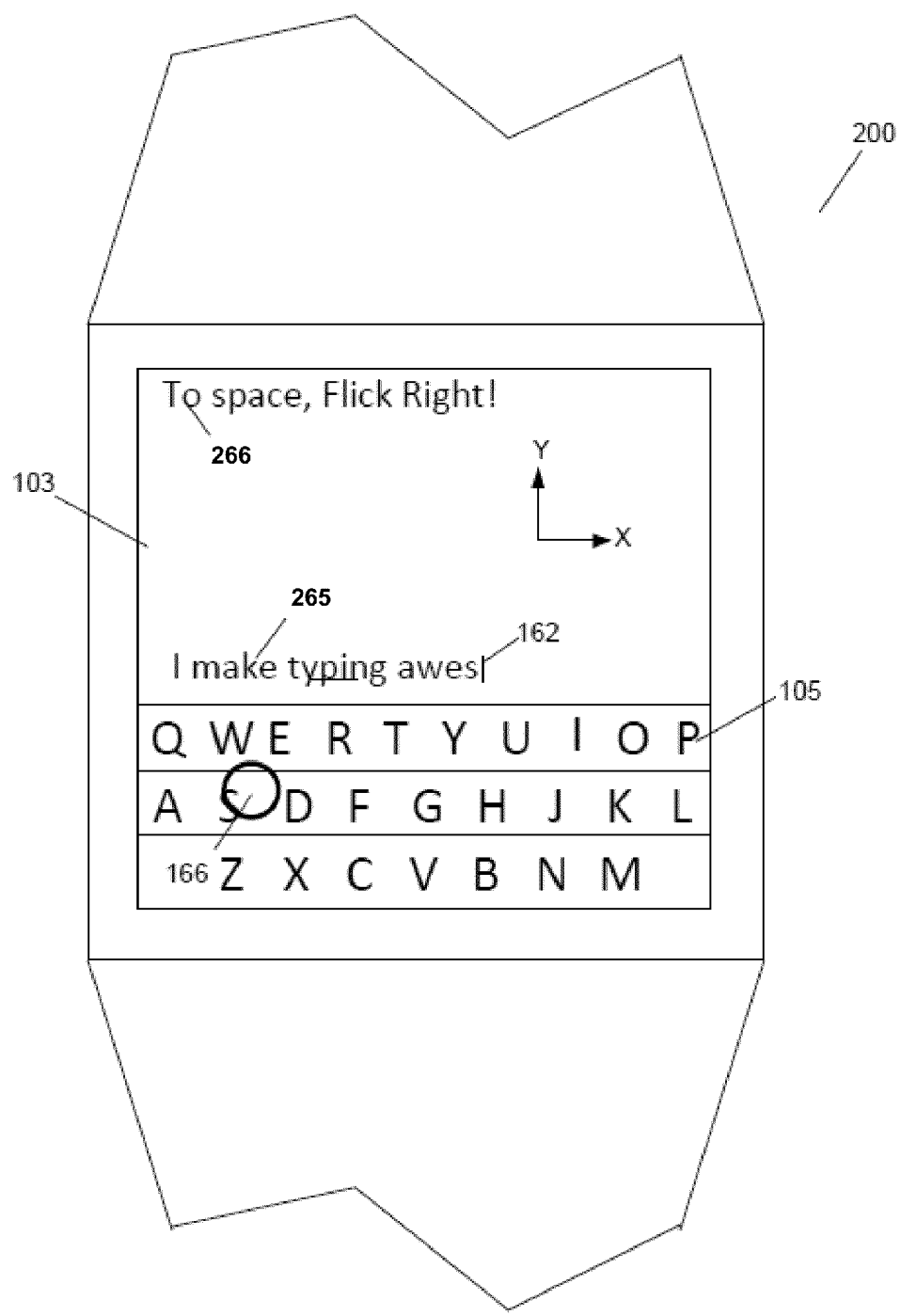
FIGS. 37-38 illustrate smart watch embodiments of a device that includes a virtual keyboard.
Figure 38:
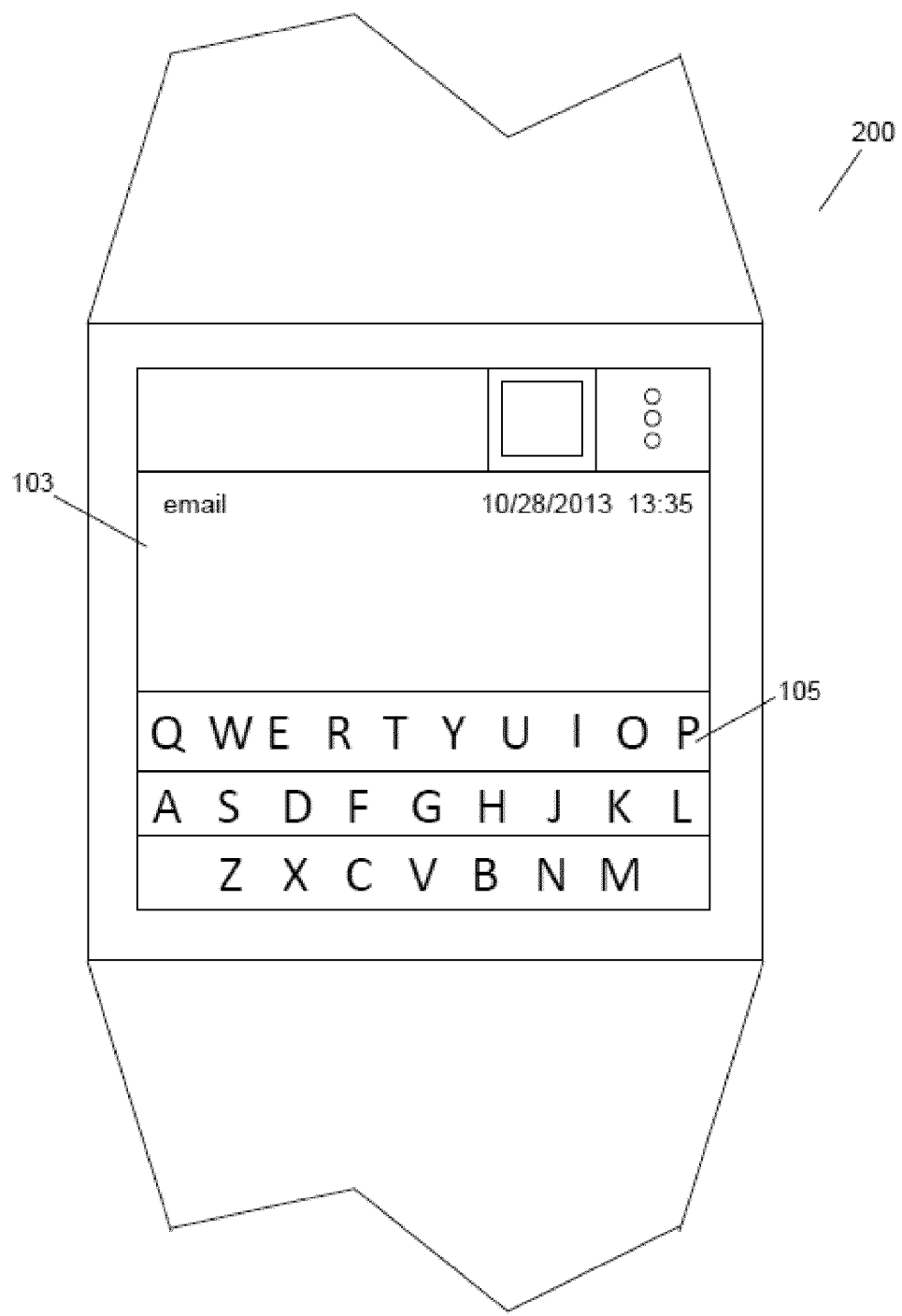

In an embodiment, the inventive system described above can be used with devices having very small touch screen inputs. FIGS. 37 - 38 illustrate embodiments of the present invention used with a smart watch 200 that includes a touch screen 103 input device. FIG. 37 illustrates an embodiment of the touch screen 103 that is very small with all unnecessary feature buttons minimized or hidden. In this configuration, the smart watch 200 may only display a very small and basic QWERTY virtual keyboard 105. The user can one finger type on the virtual keyboard 105 in the manner described above and the system will detect the input letters and gestures. The functionality will be very similar to the normal system described above but gestures may be more important because special function keys may be omitted from the small QWERTY virtual keyboard 105.

In this example, the user has typed or input by other means the text, "To space, Flick Right!" 266 and "I make typing" 265. Though not shown in FIG. 37, the system can display a set of suggested words including: typing, tycoons, typhoons and tykes. The user can then input a single finger right swipe to accept the first suggested word "typing" and add a space. For example, though not shown in FIG. 37, the system may display the text, "I make typing" 265 and lists a set of predicted words including: awesome, fun, enjoyable and efficient. In this example, the user can respond to these predicted words by inputting a single finger right swipe gesture with an initial touch down point 166 to accept the predicted word "awesome". However, the user can switch the predicted word with up/down swipes as described above. In another example (not shown in FIG. 37), the user can then input a two finger right swipe which can cause the system to display a set of punctuation marks and display the first predicted punctuation mark at the end of the text, "I make typing awesome." The user can switch the punctuation mark to any other suggested punctuation mark with up/down swipes as described above.

The left swipe functionality in the smart watch embodiment, can be substantially the same as described above. When the cursor 162 is at the end of a word, a left swipe can delete the entire word. However, if the cursor 162 is in the middle of the word, a left swipe may only delete a single character or letter for each left swipe. It is possible to repeat this function by performing a left swipe and hold so that a plurality of characters or words can be deleted with a single left swipe and hold gesture.

In yet another embodiment, the smart watch can indicate a plurality of suggested word corrections or predicted words through a voice output. The user can then scroll through the suggested word corrections by performing up and/or down swipes on the watch face as described above which can prompt the system to output an audio indication of the current suggested or predicted word. Down swipes can cause the next suggested or predicted word to be indicated and up swipes can cause the previous suggested or predicted word to be indicated. The up/down swipes can also be used to add or remove words from the system dictionary in the same manner and context as described above with reference to FIGS. 13A and 13B.

Because smart watches can have very small screens, some normal button functions can be changed to gesture functions in the smart watch embodiment. For example, a normal virtual keyboard may have a dedicated shift key to control upper and lower case letter inputs. The smart watch embodiment may remove the shift key and interpret a two finger up swipe as the shift key toggle. If the user needs to lock the shift key, the corresponding control gesture can be two finger up swipe and hold. A two finger swipe down gesture can hide or retract the keyboard. The shift lock can be dismissed with a swipe up with two fingers. In an embodiment, the screen may display an icon indicating the shift lock engagement.

The inventive system can utilize a displayed virtual keyboard shown in FIG. 29 or an invisible keyboard shown in FIG. 31. The smart watch may also include other variations similar to the keyboards described above with reference to FIGS. 30-34. In an embodiment, the user can alter the displayed keyboard between a completely invisible to a maximum size keyboard that includes the spacebar row by performing swipe up/down and hold gestures. Swiping up and holding can cause scrolling in a first direction through the available keyboards and swiping down and holding can cause scrolling in an opposite direction.

As discussed above, an embodiment of the present invention uses a keyboard button to shift keyboards. In the smart watch embodiment, two finger taps may cause the system to scroll through different types of keyboards which can be similar to the keyboards described above with reference to FIGS. 29-34. There can be various keyboards including letters, numbers and symbols. If the user passes a desired keyboard, he or she can get back to this keyboard by repeating the two finger tap gesture. A two finger tap and hold can be used by the system to enable a voice to text function. Repeating the two finger tap and hold can cause the system to disable the voice to text function.

If the user taps and holds on a specific letter, number, symbol or character on a keyboard, the system can respond by displaying variations on the selected text. For example, if a user taps and holds on the "a" key, the system may display a set of similar letters such as: á, à, â, ä, ã, and å. The system may perform a different function if the user taps and holds in a different context. For example, if the user taps and holds on input text, the system can respond by magnifying the selected text away from the finger so that the user can check for accurate input. In addition to taping and holding, the inventive system may perform the described functions by tapping and dragging the finger to the area of interest on the smart watch display.

The smart watch may be able to control various different program applications that perform various different functions. Thus, it would be useful for the described gestures to provide different functionality in different applications. For example, as shown in FIG. 38, in text input applications such as email, text processing, etc., a right swipe and hold gesture can cause a new line to be input. This can be similar to a return button on a normal keyboard. However, in a search application such as GOOGLE, a registered trademark of Google Inc., the right swipe and hold gesture can indicate that they user wants the program to perform a search. In other applications, the right swipe can cause a program or a portion of a program to go or run.

In other embodiments, the system can add these sensor inputs to the system's recognized controls. As discussed, the inventive smart watch embodiment, may also utilize other sensors such as accelerometers or gyroscopes that can be used as input control signals in addition to the taps and gestures on the touch screen as discussed above with reference to FIG. 2.

The internal accelerometers may detect taps on the watch or other movements of the watch and the gyroscopes can detect rotation of the watch. For example, the system may perform word correction and space function in response to an accelerometer detected taps anywhere on the watch. Thus, a user would input the letters for a word and then tap on any non-keyboard portion of the smart watch to cause the system to input a space after the word. This function can be substantially the same as the functions described above with reference to the right swipe gesture.

Other sensor detected user and watch movements can cause the smart watch to perform other functions. For example, the X and Y axis gyroscopes can detect rotation about the X and Y axis of the smart watch. The user's arm can be substantially aligned with the X axis and perpendicular to the Y axis. Thus, a left hand downward wrist rotation movement can be detected as a counter clockwise rotation about the Y axis and an upward wrist rotation movement can be detected as a clockwise rotation about the Y axis by the Y axis gyroscope. Similarly, the outward rotation of the hand can be detected as a clockwise rotation about the X axis and inward rotation can be detected as clockwise rotation about the X axis by the X axis gyroscope. These rotations can correspond to the different direction single finger swipe functions described above. More specifically, the right swipe functions can be performed in response to a left wrist down rotation, left swipe functions can be performed in response to the left wrist up rotation, up swipe functions can be performed in response to outward rotation and down swipe functions can be performed in response to inward rotation.

More specifically, the smart watch can perform the described word correction and space input functions in response to the left wrist down movement and perform letter or word delete functions in response to left wrist up movements. In the suggested word mode, outward and inward wrist twists can allow a user to scroll through suggested words, as described above with the up/down swipes. The described swipe and hold functions can also be performed through physical movement of the smart watch. For example, moving and holding the wrist can cause the system to perform the corresponding described swipe and hold functions.

In an embodiment, the system may recognize that the described text input methods can only function when the smart watch is in a limited range of positions typically with the face in an upward position. The system may go into a sleep mode or other energy saving modes when the watch is not in an operating position or if rapid motion is detected indicating that the user is currently performing an athletic task.

Accessibility Modes

The system may use a device other than a screen to provide the feedback to the user. For instance, the present invention may be employed with an audio output device such as speakers or headphones. In certain embodiments of the invention, the user will type using the usual tap gestures. The device may provide audible signals for each tap gesture. Once a rightwards swipe is given by the user, the system will correct the input and read back the correction using audio output. The user may then apply the upwards/downwards swipe gestures to change the correction with the next or previous suggestion, also to be read via audio output after each gesture. Such an embodiment may allow use of the invention by visually impaired user, or may enable its application in devices without screens, or by users who prefer to type without looking at the screen.

In an embodiment, the inventive system may include an audio output and may also provide audio feedback for some or all of the additional functions described above. For instance, the deletion of words as described could be announced with a special sound or voice, and deletion of characters could be indicated with a different sound or voice. Many mobile devices such as cell phones also have a vibration feature that can be used by the inventive system to provide motion feedback when text input functions are actuated. In other embodiments, a variety of sounds and/or vibrating feedback could be used in response to different swiping gestures input by the user and detected by the inventive system.

Because the visually impaired may not be able to see the keyboards displayed on the screen, the inventive system may include gesture controls for inputting common and necessary text commands. For example, the system may interpret a two finger down swipe as a new line input. The system may also interpret a two finger up swipe as a signal to invoke a menu. The system may then announce the menu rather than displaying the menu so the user can respond to the audio prompts by tapping on the touch screen to select the desired menu item. In an embodiment, the inventive system may detect the user of special device features such as VoiceOver(a product of Apple Inc.) on IOS (a registered trademark of Cisco Systems, Inc.) or Talkback (a product of Google Inc.) on ANDROID (a trademark of Google Inc.) and activate the accessibility features based upon the user's actuation of these accessibility features.

Three Dimensional Space Gestures

Figure 39:
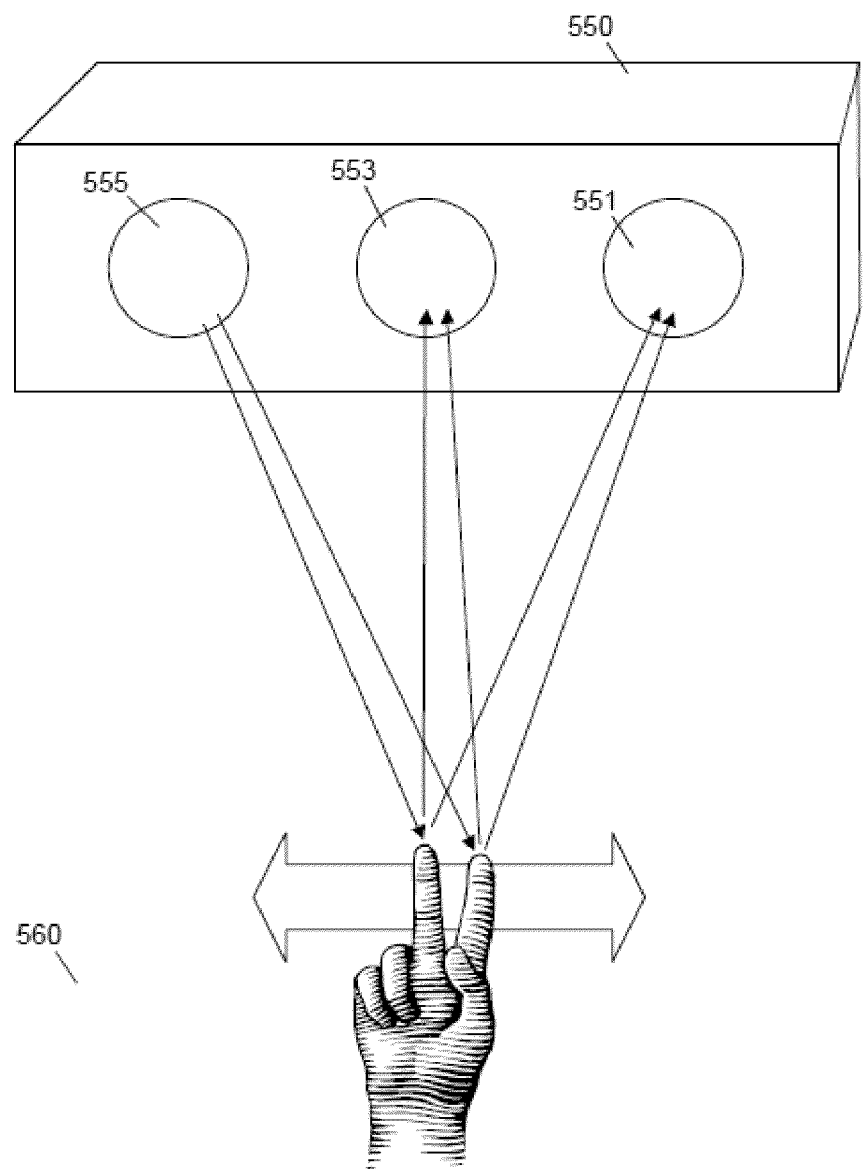
FIG. 39 illustrates an embodiment of cameras used to detect gestures used with embodiments of the inventive system.

While the inventive system has been described with a touch screen input, in other embodiments, the inventive system can be implemented through other input devices such as cameras which may be built into the device. With reference to FIG. 39, in an embodiment body movement or finger gestures of a user can be obtained using an optical device comprising an image camera 551, an infrared (IR) camera 553 and an infrared (IR) light source 555 coupled to a signal processor. The IR light source 555, IR camera 553 and an image camera 551 can all be mounted on one side of the optical device 550 so that the image camera 551 and IR camera 553 have substantially the same field of view and the IR light source 551 projects light within this same field of view. The IR light source 555, IR camera 553 and image camera 551 can be mounted at fixed and known distances from each other on the optical device 550. The image camera 551 can provide information for the patient's limb 560 or portion of the patient within the viewing region of the camera 551. The IR camera 553 and IR light source 555 can provide distance information for each area of the patient's limb or digits 560 exposed to the IR light source 555 that is within the viewing region of the IR camera 553. The infrared light source 555 can include an infrared laser diode and a diffuser. The laser diode can direct an infrared light beam at the diffuser causing a pseudo random speckle or structured light pattern to be projected onto the user's body 560. The diffuser can be a diffraction grating which can be a computer-generated hologram (CGH) with a specific periodic structure. The IR camera 553 sensor can be a CMOS detector with a band-pass filter centered at the IR laser wavelength. In an embodiment, the image camera 551 can also detect the IR light projected onto the user's limbs, hands or digits 560.

In an embodiment the system may include a user interface that allows a user to configure the inventive system to the desired operation. The described functions can be listed on a settings user interface and each function may be turned on or off by the user. This can allow the user to customize the system to optimize inputs through the touch screen of the electronic device.

It will be understood that the inventive system has been described with reference to particular embodiments, however additions, deletions and changes could be made to these embodiments without departing from the scope of the inventive system. Although the order filling apparatus and method have been described include various components, it is well understood that these components and the described configuration can be modified and rearranged in various other configurations.

What is claimed is:

1. A method for inputting text, comprising:
    at a computer system having one or more processors, a touch screen, and memory storing programs for execution by the one or more processors,
    displaying a virtual keyboard on the touch screen;
    detecting user touches on the virtual keyboard;
    in response to the user touches, generating text input to the computer system and displaying the text input as it is generated;
    detecting a swipe gesture on the touch screen, the swipe gesture including an initial touchdown point and a direction;
    determining the direction of the swipe gesture;
    determining a context based upon the text input, wherein the context includes one of the text input representing a partial word, a complete word, and a sentence;
    determining a type of the swipe gesture, wherein the type includes one of a single finger swipe gesture, a two finger swipe gesture, and a three finger swipe gesture; and
    performing a predetermined editing function in relation to the text input based on a respective combination of the determined direction, context and type of the swipe gesture, wherein each of a plurality of different respective combinations is associated with a different editing function and wherein the predetermined editing function is performed upon determination of the combination without further user input.

2. The method of claim 1, further comprising:
    displaying a suggested word on the touch screen based on the text input; and
    when the context is the text input representing a partial word, in response to a first distinct combination of the determined direction and type of the swipe gesture, changing the text input to the suggested word.

3. The method of claim 1, further comprising:
    when the context is the text input representing a complete word, in response to a second distinct combination of the determined direction and type of the swipe gesture, displaying a first predicted word on the touch screen after the displayed complete word.

4. The method of claim 3, further comprising:
    when the context is displaying the first predicted word, in response to a fourth distinct combination of the determined direction and type of the swipe gesture, ceasing display of the first predicted word on the touch screen.

5. The method of claim 3, further comprising:
    when the context is displaying the first predicted word, in response to a fifth distinct combination of the determined direction and type of the swipe gesture, displaying a second predicted word on the touch screen instead of the first predicted word.

6. The method of claim 5, further comprising:
    when the context is displaying the second predicted word, in response to the fifth distinct combination of the determined direction and type of the swipe gesture, displaying a third predicted word on the touch screen instead of the second predicted word.

7. The method of claim 3, further comprising:
    selecting for display the first predicted word, a second predicted word, and a third predicted word such that the first predicted word has a higher n-gram probability than the second predicted word and the second predicted word has a higher n-gram probability than the third predicted word.

8. The method of claim 1, further comprising:
    when the context is the text input representing a partial word, in response to a third distinct combination of the determined direction and type of the swipe gesture, deleting a last character of the text input.

9. The method of claim 1, wherein a first predicted word and a plurality of predicted words are determined by a highest n-gram probability based on the text input.

10. The method of claim 9, wherein the n-gram is a bigram, a trigram or a quadgram.

11. The method of claim 1, further comprising:
    when the context is displaying the sentence, displaying one or more punctuation marks in addition to displaying the first predicted word or the plurality of predicted words.

12. The method of claim 1, further comprising:
    in response to a sixth distinct combination of the determined direction and type of the swipe gesture, ceasing display of the virtual keyboard and replacing the virtual keyboard with a second keyboard layout that is invisible.

13. The method of claim 12, wherein the virtual keyboard is a QWERTY keyboard and the second keyboard layout is not a QWERTY keyboard.

14. The method of claim 1, wherein the computer system is a mobile device, the touch screen is small, and the mobile device includes at least one of an accelerometer and a gyroscope, further comprising:
    if the mobile device includes the accelerometer, detecting with the accelerometer gestures that include taps on the mobile device or motion of the mobile device; and
    if the mobile device includes the gyroscope, detecting with the gyroscope gestures that include rotations of the mobile device.

15. The method of claim 14, wherein the mobile device includes a microphone, further comprising:
    in response to a seventh distinct combination of the determined direction and type of swipe gesture, actuating a voice to text input function and enabling a user to provide the text input using the microphone.

16. The method of claim 14, wherein the mobile device is a smart watch.

17. An electronic device, comprising:
    one or more processors;
    a touch screen; and
    memory storing programs for execution by the one or more processors, the programs including instructions for:
        displaying a virtual keyboard on the touch screen;
        detecting user touches on the virtual keyboard;
        in response to the user touches, generating text input to the computer system and displaying the text input as it is generated;
        detecting a swipe gesture on the touch screen, the swipe gesture including an initial touchdown point and a direction;
        determining the direction of the swipe gesture;
        determining a context based upon the text input, wherein the context includes one of the text input representing a partial word, a complete word, and a sentence;

determining a type of the swipe gesture, wherein the type includes one of a single finger swipe gesture, a two finger swipe gesture, and a three finger swipe gesture; and performing a predetermined editing function in relation to the text input based on a respective combination of the determined direction, context and type of the swipe gesture, wherein each of a plurality of different respective combinations is associated with a different editing function and wherein the predetermined editing function is performed upon determination of the combination without further user input.

18. The electronic device of claim 17, further comprising:
in response to a distinct combination of the determined direction and type of the swipe gesture, ceasing display of the virtual keyboard and replacing the virtual keyboard with a second keyboard layout that is invisible.

19. The electronic device of claim 18, wherein the virtual keyboard is a QWERTY keyboard.

20. The electronic device of claim 17, wherein the electronic device is a mobile device, the touch screen is small, and the device includes at least one of an accelerometer and a gyroscope, further comprising:
if the mobile device includes the accelerometer, detecting with the accelerometer gestures that include taps on the mobile device or motion of the mobile device; and
if the mobile device includes the gyroscope, detecting with the gyroscope gestures that include rotations of the mobile device.

21. The electronic device of claim 20, wherein the mobile device includes a microphone, further comprising:
in response to a distinct combination of the determined direction and type of swipe gesture, actuating a voice to text input function and enabling a user to provide the text input using the microphone.

22. The electronic device of claim 20, wherein the electronic device is a smart watch.

23. A non-transitory computer readable storage medium storing one or more programs, the one or more programs comprising instructions, which when executed by an electronic device with a touch screen, cause the electronic device to perform operations comprising:
displaying a virtual keyboard on the touch screen;
detecting user touches on the virtual keyboard;
in response to the user touches, generating text input to the computer system and displaying the text input as it is generated;
detecting a swipe gesture on the touch screen, the swipe gesture including an initial touchdown point and a direction;
determining the direction of the swipe gesture;
determining a context based upon the text input, wherein the context includes one of the text input representing a partial word, a complete word, and a sentence;
determining a type of the swipe gesture, wherein the type includes one of a single finger swipe gesture, a two finger swipe gesture, and a three finger swipe gesture; and
performing a predetermined editing function in relation to the text input based on a respective combination of the determined direction, context and type of the swipe gesture,
wherein each of a plurality of different respective combinations is associated with a different editing function and wherein the predetermined editing function is performed upon determination of the combination without further user input.

* * * * *